(12) United States Patent
Kamo

(10) Patent No.: US 6,473,249 B1
(45) Date of Patent: Oct. 29, 2002

(54) PRISM OPTICAL SYSTEM AND IMAGE PICKUP APPARATUS USING THE SAME

(75) Inventor: Yuji Kamo, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/029,256

(22) Filed: Dec. 28, 2001

Related U.S. Application Data

(62) Division of application No. 09/505,677, filed on Feb. 17, 2000, now Pat. No. 6,373,645.

(30) Foreign Application Priority Data

Feb. 23, 1999 (DE) .......................................... 11-044345

(51) Int. Cl.$^7$ ................................................ G02B 5/04
(52) U.S. Cl. ....................... 359/834; 359/831; 359/837; 359/631; 359/633
(58) Field of Search ................................ 359/834, 631, 359/633, 637, 669, 831, 835, 837

(56) References Cited

U.S. PATENT DOCUMENTS 5,325,237 A 6/1994 Sagan 6,120,156 A 9/2000 Akiyama

FOREIGN PATENT DOCUMENTS

| JP | 9-33855 | 2/1997 |
|---|---|---|
| JP | 9-73043 | 3/1997 |
| JP | 9-197336 | 7/1997 |

*Primary Examiner*—Mohammad Sikder
(74) *Attorney, Agent, or Firm*—Pillsbury Winthrop LLP

(57) ABSTRACT

The present invention relates to a compact and high-performance prism optical system having, in order in which light rays pass from the object side, a first transmitting surface (4), a first reflecting surface (5), a second reflecting surface (6), a third reflecting surface (7), and a second transmitting surface (8). When an axial principal ray (1) is projected onto a plane defined by three points at which the axial principal ray (1) impinges on the first transmitting surface (4), the first reflecting surface (5) and the second reflecting surface (6), the projected axial principal ray forms an optical path that bends at two consecutive reflecting surfaces (5, 6) in the same direction with respect to the direction of travel of the rays and bends at the other reflecting surface (7) in a direction different from the direction of bending at the two reflecting surfaces. At least one of the three reflecting surfaces is a rotationally asymmetric surface.

19 Claims, 16 Drawing Sheets

45 Shutter
46 Flash
43 Finder optical system
40 Camera
44 Optical path for finder
41 Photographic optical system
42 Optical path for photography 40 Camera
45 Shutter
47 Liquid crystal display monitor
44 Optical path for finder

PRISM OPTICAL SYSTEM AND IMAGE PICKUP APPARATUS USING THE SAME

CROSS REFERENCE TO RELATED APPLICATIONS

This application is a divisional of U.S. application Ser. No. 09/505,677, filed Feb. 17, 2000 U.S. Pat No. 6,373,645, the specification of which is incorporated by reference for all purposes.

BACKGROUND OF THE INVENTION

The present invention relates to prism optical systems including a reflecting surface that is decentered and has a power, for example, a prism optical system for use in an image-forming optical system, a finder optical system, etc. used in cameras, video cameras and so forth.

Recently, there have been proposed optical systems designed to be compact in size by giving a power to a reflecting surface and folding an optical path in the direction of the optical axis. In such optical systems, a prism or a mirror is mainly used as a member having a reflecting surface with a power. An optical system having a prism and an optical system having a mirror are largely different in characteristics from each other although these optical systems are the same in terms of the structure using a reflecting surface.

When a curvature (radius r of curvature) is given to a reflecting surface of a prism and to a reflecting surface of a mirror, the power of each of the reflecting surfaces is given by the paraxial power calculating equation as follows. The power of the reflecting surface of the prism is −2n/r in a case where the prism is filled therein with a medium having a refractive index n larger than 1, whereas the power of the reflecting surface of the mirror is −2/r. Thus, even when these reflecting surfaces have the same curvature, the powers are different from each other. Accordingly, the curvature required for the prism is 1/n of the curvature required for the mirror to obtain the same power. Therefore, the prism produces a smaller amount of aberration at the reflecting surface than in the case of the mirror. Thus, the prism is more favorable than the mirror in terms of performance. Moreover, the prism has two refracting surfaces, i.e. an entrance refracting surface and an exit refracting surface, in addition to a reflecting surface as a single member. Therefore, the prism is advantageous from the viewpoint of aberration correction in comparison to the mirror, which has only a reflecting surface as a single member. Furthermore, because the prism is filled with a medium having a refractive index larger than 1, it is possible to obtain a longer optical path length than in the case of the mirror, which is placed in the air. Accordingly, it is relatively easy with the prism to provide the required reflecting surface even when the focal length is short. In general, reflecting surfaces require a high degree of accuracy for assembly because decentration errors of reflecting surfaces cause the performance to be degraded to a considerable extent in comparison to refracting surfaces. In a case where an optical system is constructed by arranging a plurality of reflecting surfaces, the prism is more advantageous than the mirror because the prism enables a plurality of reflecting surfaces to be integrated into one unit so as to fix the relative positions and is therefore capable of preventing performance degradation due to assembling. Thus, the prism is superior to the mirror in many respects.

Meanwhile, when a surface with a power is placed at a tilt to the optical axis, rotationally asymmetric aberrations are produced. For example, if a rotationally asymmetric distortion occurs, a square object may become trapezoidal undesirably. Such rotationally asymmetric aberrations (hereinafter referred to as "decentration aberrations") are impossible to correct by a rotationally symmetric surface in theory. For this reason, rotationally asymmetric curved surfaces, e.g. anamorphic surfaces, are used in conventional prism optical systems.

Such prism optical systems include the disclosure of Japanese Patent Application Unexamined Publication (KOKAI) Number [hereinafter referred to as "JP(A)"] 8-313829. JP(A) 8-313829 discloses an ocular optical system comprising a prism in which there are two reflections, and a first transmitting surface and a second reflecting surface, as counted from the pupil side, are formed from the identical surface. In this optical system, all reflecting surfaces are rotationally asymmetric anamorphic surfaces.

Among the conventional prism optical systems using rotationally asymmetric curved surfaces, prism optical systems in which there are three reflections, in particular, are disclosed in JP(A) 9-33855, 9-73043 and 9-197336. These optical systems use spherical or anamorphic surfaces as reflecting surfaces.

JP(A) 9-33855 discloses an ocular optical system in which an optical axis thereof forms an optical path that makes one turn in the prism. A third reflecting surface and a first transmitting surface, as counted from the pupil side, are formed from the identical surface, and a second reflecting surface and a second transmitting surface are formed from the identical surface. The prism optical system has only one reflecting surface that is independent of other transmitting and reflecting surfaces, i.e. the second reflecting surface. The direction in which light exits from the prism optical system is about 45 degrees oblique to the direction in which light enters the prism optical system.

JP(A) 9-73043 discloses an ocular optical system in which an optical axis thereof forms an M-shaped optical path. In Example 5 of JP(A) 9-73043, for instance, a second reflecting surface and a second transmitting surface, as counted from the pupil side, are formed from the identical surface. The prism optical system has only two surfaces that are independent of other transmitting and reflecting surfaces, i.e. a first reflecting surface and a third reflecting surface. In this example, the direction in which light exits from the prism optical system is opposite to the direction in which light enters the optical system. In JP(A) 9-197336, which has an arrangement similar to the above, a second reflecting surface, as counted from the pupil side, is formed from the identical surface with a first transmitting surface and a second transmitting surface.

These prior art prism optical systems suffer, however, from various problems as stated below.

In JP(A) 8-313829, the reflecting surfaces of the prism are given a power. However, because the prism optical system has only two reflecting surfaces, there is a limit in achieving high performance. If the aperture becomes large or the field angle becomes large, the optical system may fail to fulfill the required performance.

Accordingly, it is conceivable to increase the number of reflections so that aberration correction can be made even more effectively. However, a reduction in size and an increase in performance cannot simultaneously be attained in all the prior art prism optical systems in which there are three reflections, that is, the number of reflections is larger than that in the above-described prior art prism optical system by one.

In JP(A) 9-33855, the optical path is arranged to turn in the prism. Therefore, a reduction in size of the prism can be attained effectively by folding the optical path. However, as the light beam becomes large, it is difficult to form two transmitting surfaces and three reflecting surfaces by using independent surfaces, respectively, owing to the structure thereof. Therefore, it is inevitably necessary to form the first transmitting surface and the third reflecting surface from the identical surface and to form the second transmitting surface and the first transmitting surface from the identical surface. Consequently, the angle of reflection at each of the first and third reflecting surfaces needs to be not less than the total reflection critical angle. Therefore, aberration correction cannot satisfactorily be effected. In addition, because the angle of reflection is limited at two of the three reflecting surfaces, there is almost no freedom for the exit direction with respect to the entrance direction. Therefore, considering placement of another member, there are cases where it is impossible to achieve a reduction in size of the prism optical system.

In JP(A) 9-73043 and 9-197336, the prism optical system has an M-shaped optical path. Therefore, the second reflecting surface is likely to overlap the effective portion of a light beam passing through either or both of the first and second transmitting surfaces. Accordingly, the second reflecting surface unavoidably needs to be formed from the identical surface with either or both of the first and second transmitting surfaces. For this reason, the angle of reflection at the second reflecting surface needs to be not less than the total reflection critical angle as in the case of the above. Consequently, satisfactory aberration correction cannot be effected. In addition, because the exit direction is nearly parallel to the entrance direction, if the back focus is increased, or if another optical system is connected to the prism optical system, the resulting optical system becomes undesirably large in size in the entrance direction. Therefore, there are cases where it is impossible to achieve a reduction in size of the optical system.

Thus, all the prior art prism optical systems involve problems in terms of performance or size. There has heretofore been no compact and high-performance prism optical system that satisfies the demand for an improvement in performance and the demand for a reduction in size at the same time.

SUMMARY OF THE INVENTION

In view of the above-described problems associated with the prior art, an object of the present invention is to provide a compact and high-performance prism optical system.

A prism optical system according to the present invention provided to attain the above-described object has, in order in which light rays pass from the object side, a first transmitting surface, a first reflecting surface, a second reflecting surface, a third reflecting surface, and a second transmitting surface. When an axial principal ray is projected onto a plane defined by three points at which the axial principal ray impinges on the first transmitting surface, the first reflecting surface and the second reflecting surface, the projected axial principal ray forms an optical path that bends at two consecutive reflecting surfaces in the same direction with respect to the direction of travel of the rays and bends at the other reflecting surface in a direction different from the direction of bending at the two reflecting surfaces. At least one of the three reflecting surfaces is a rotationally asymmetric surface.

Another prism optical system according to the present invention has, in order in which light rays pass from the object side, a first transmitting surface, a first reflecting surface, a second reflecting surface, a third reflecting surface, and a second transmitting surface. When an axial principal ray is projected onto a plane defined by three points at which the axial principal ray impinges on the first transmitting surface, the first reflecting surface and the second reflecting surface, the projected axial principal ray forms an optical path that bends at the first and second reflecting surfaces in the same direction with respect to the direction of travel of the rays and bends at the third reflecting surface in a direction different from the direction of bending at the first and second reflecting surfaces. At least one of the three reflecting surfaces is a rotationally asymmetric surface.

Still another prism optical system according to the present invention has, in order in which light rays pass from the object side, a first transmitting surface, a first reflecting surface, a second reflecting surface, a third reflecting surface, and a second transmitting surface. When an axial principal ray is projected onto a plane defined by three points at which the axial principal ray impinges on the first transmitting surface, the first reflecting surface and the second reflecting surface, the projected axial principal ray forms an optical path that bends at the second and third reflecting surfaces in the same direction with respect to the direction of travel of the rays and bends at the first reflecting surface in a direction different from the direction of bending at the second and third reflecting surfaces. At least one of the three reflecting surfaces is a rotationally asymmetric surface.

A further prism optical system according to the present invention has three prism reflecting surfaces placed between an aperture of the prism optical system and an object plane or an image plane. The prism optical system has, in order in which light rays pass from the object side, a first transmitting surface, a first reflecting surface, and a second reflecting surface. When an axial principal ray is projected onto a plane defined by three points at which the axial principal ray impinges on the first transmitting surface, the first reflecting surface and the second reflecting surface, the projected axial principal ray forms an optical path that bends at two consecutive reflecting surfaces in the same direction with respect to the direction of travel of the rays and bends at the other reflecting surface in a direction different from the direction of bending at the two reflecting surfaces. At least one of the three reflecting surfaces is a rotationally asymmetric surface.

The reasons for adopting the above-described arrangements in the present invention, together with the functions thereof, will be described below.

As has been stated in regard to the prior art, if a reflecting surface is tilted with respect to the optical axis, rotationally asymmetric decentration aberrations are produced. Therefore, it is desirable that at least one reflecting surface of the surfaces used in the present invention should be a rotationally asymmetric surface. If a rotationally asymmetric surface is used as at least one reflecting surface, it becomes possible to correct the rotationally asymmetric decentration aberrations.

Let us explain the definition of a decentered system.

First, a coordinate system used in the following description and rotationally asymmetric surfaces will be described.

When a light ray from the object center that passes through the center of the stop and reaches the center of the image plane is defined as an axial principal ray, an optical axis defined by a straight line along which the axial principal ray travels until it intersects the first surface of the optical system is defined as a Z-axis. An axis perpendicularly intersecting the Z-axis in the decentration plane of each surface constituting the prism optical system is defined as a Y-axis. An axis perpendicularly intersecting the optical axis and also perpendicularly intersecting the Y-axis is defined as an X-axis. In the following description, ray tracing is forward ray tracing in which rays are traced from the object toward the image plane.

The rotationally asymmetric surface used in the present invention should preferably be a plane-symmetry free-form surface having only one plane of symmetry.

Free-form surfaces used in the present invention are defined by the following equation (A).

$$Z = C_2 X + C_3 Y +$$
$$C_4 X^2 + C_5 XY + C_6 Y^2$$
$$+ C_7 X^3 + C_8 X^2 Y + C_9 XY^2 + C_{10} Y^3$$
$$+ C_{11} X^4 + C_{12} X^3 Y + C_{13} X^2 Y^2 + C_{14} XY^3 + C_{15} Y^4$$
$$+ C_{16} X^5 + C_{17} X^4 Y + C_{18} X^3 Y^2 + C_{19} X^2 Y^3 + C_{20} XY^4$$
$$+ C_{21} Y^5$$
$$+ C_{22} X^6 + C_{23} X^5 Y + C_{24} X^4 Y^2 + C_{25} X^3 Y^3 + C_{26} X^2 Y^4 + C_{27} XY^5 + C_{28} Y^6$$
$$+ C_{29} X^7 + C_{30} X^6 Y + C_{31} X^5 Y^2 + C_{32} X^4 Y^3 + C_{33} X^3 Y^4$$
$$+ C_{34} X^2 Y^5 + C_{35} XY^6 + C_{36} Y^7 \quad (A)$$

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (A), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (A), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

It becomes possible to correct decentration aberrations by using such a rotationally asymmetric surface. However, if the number of aberration correcting surfaces is small, the increase in performance is limited even if rotationally asymmetric surfaces are used. Therefore, increasing the number of reflecting surfaces of the prism optical system is favorable from the viewpoint of performance.

However, simply increasing the number of reflecting surfaces of the prism is not always favorable for performance. The prism generally needs to fold light rays so that the effective portions of the reflecting surfaces do not overlap each other. Therefore, when there are a surface a, a surface b, and a surface c in order in which rays pass, for example, it is necessary to increase the angle of reflection at the surface b or to increase the spacing between the surfaces a and b and the spacing between the surfaces b and c so that the effective portions of these surfaces do not overlap each other. The amount of decentration aberrations produced by a reflecting surface generally becomes larger as the angle of reflection at the surface increases. Therefore, increasing the reflection angle is unfavorable for performance. If the spacing between the reflecting surfaces is increased, it becomes necessary to increase the optical path length. Consequently, the load of ensuring the required performance becomes unfavorably heavy, and the prism also becomes unfavorably large in size.

In a case where the effective portions undesirably overlap each other as stated above, it is conceivable to adopt a method in which a transmitting surface and a reflecting surface are formed from the identical surface by using total reflection (such a reflecting surface will hereinafter be referred to as "a mutual reflecting surface"; a reflecting surface that is not formed from the identical surface with a transmitting surface will hereinafter be referred to as "an independent reflecting surface"). In this method, a single surface is arranged to refract light when it is transmitted and to totally reflect light when it is reflected, thereby allowing one and the same surface to function as both transmitting and reflecting surfaces. With this arrangement, the effective portions of the reflecting and transmitting surfaces are permitted to overlap each other. Accordingly, the restrictions on the reflection angle and the reflecting surface separation are relaxed. However, as has been stated above, if a strong power is given to a surface having a large reflection angle, the amount of decentration aberrations produced by this surfaces increases unfavorably. Therefore, a very strong power cannot be given to a mutual reflecting surface, at which the reflection angle cannot be made smaller than the total reflection critical angle (critical angle), and satisfactory aberration correction cannot be effected. Accordingly, the use of a mutual reflecting surface is not always advantageous in terms of performance.

The reason why the performance cannot always be improved even if the number of reflecting surfaces is increased is that the effective portions of reflecting surfaces undesirably overlap each other. Therefore, in order to improve the performance effectively when the number of reflecting surfaces is increased, it is necessary to place reflecting surfaces so that the effective portions thereof do not overlap each other. At the same time, it is necessary to fold the optical axis so as to reduce the size of the optical system. Accordingly, the present invention proposes a compact and high-performance prism optical system attained by appropriately setting the path of rays, that is, optical path, which is determined by the arrangement of reflecting surfaces and the reflection direction.

Let us give a definition of the optical path. When an optical path is folded by a plurality of reflecting surfaces, the optical axis is not always in one plane, but the optical axis may take a three-dimensional optical path, which is not in the same plane. In the prism optical system according to the present invention also, the optical axis may take a three-dimensional optical path. In the following description, the optical path will be defined on a two-dimensional basis such that a three-dimensional optical path is also included.

The optical axis of a decentered optical system is defined by a light ray from the object center that passes through the center of the stop and reaches the center of the image plane. This ray will hereinafter be referred to as "axial principal ray". When a plane is defined by three points at which the axial principal ray impinges on a first transmitting surface, a first reflecting surface and a second reflecting surface placed in order in which light rays pass from the object side, the optical path is defined by the projective axial principal ray, that is, the axial principal ray as projected onto the reference plane. With this definition, a three-dimensional optical path is also included in the scope of the present invention.

Increasing the number of reflections in a prism is favorable from the viewpoint of performance but unfavorable from the viewpoint of size. Thus, the number of reflections relates to both performance and size. In the present invention, therefore, the number of reflections is set at a value with which an increase in performance and a reduction in size can be effectively attained with good balance. If the number of reflections in the prism optical system is two or less, the effect of correcting decentration aberrations is limited, as stated above in regard to the prior art. Therefore, reducing the number of reflections to two or less is unfavorable from the viewpoint of performance. If the number of reflections is increased to four or more, the degree of freedom in the optical path folding direction is reduced, and it becomes difficult to construct the prism optical system in a compact form. In addition, if the number of reflections is increased, the desired prism cannot be constructed unless common reflecting surfaces are used. Thus, increasing the number of reflections is not always favorable for performance. Moreover, if the number of reflections is increased, the effect of manufacturing errors on performance is intensified correspondingly, causing the performance to be degraded unfavorably. Accordingly, the number of reflections is set at three in the prism optical system according to the present invention.

When the optical path of a prism in which there are three reflections is set according to the above-described definition, reflection directions can be divided into two directions, i.e. right and left, with respect to the travel direction of the optical axis. Accordingly, there are 8 different courses that the optical path can take. If symmetric ones are removed from the 8 courses, courses that the optical path can take may be divided into four types as shown in parts (a) to (d) of FIG. 21. To attain a reduction in size, which is an object of the present invention, the optical path needs to be folded in a compact form. In order to achieve high performance, it is necessary to set the optical path so that the effective portion of a transmitting surface and that of a reflecting surface do not overlap each other. Of the four types shown in FIG. 21, the optical path shown in part (a) unavoidably requires the first and third reflecting surfaces to be mutual reflecting surfaces because the effective portions of the transmitting and reflecting surfaces undesirably overlap each other when the light beam is large in size. Consequently, two of the three reflecting surfaces need to be totally reflecting surfaces. This is disadvantageous from the viewpoint of performance. Accordingly, with the optical path shown in part (a) of FIG. 21, the object of the present invention, particularly an improvement in performance, cannot be attained. The optical path shown in part (d) of FIG. 21 is not effectively folded. Accordingly, the size in the direction of the optical axis entering the prism or in a direction perpendicular to the entering optical axis tends to become large, and thus the prism cannot be made compact. Particularly, if each surface is formed from an independent surface, the prism becomes undesirably large in size. For this reason, it is difficult to achieve a reduction in size even if high performance can be attained. Accordingly, with the optical path shown in part (d) of FIG. 21, the object of the present invention, particularly a reduction in size, cannot be attained.

In the optical paths shown in parts (b) and (c) of FIG. 21, on the other hand, the effective portions of the surfaces are unlikely to overlap each other, and it is possible to form each reflecting surface as an independent reflecting surface. This is advantageous from the viewpoint of performance. In addition, the optical path is bent in the same direction at two consecutive reflecting surfaces. Therefore, in the optical path shown in part (b) of FIG. 21, it is possible to reduce the size, particularly the size in the direction of the optical axis entering the prism. In the optical path shown in part (c) of FIG. 21, it is possible to reduce the size, particularly the size in a direction perpendicular to the entering optical axis.

That is, it is possible to attain a reduction in size and an improvement in performance simultaneously, which is the object of the present invention, by taking an optical path that bends at two consecutive reflecting surfaces in the same direction with respect to the travel direction of the rays and bends at the other reflecting surface in a direction different from the direction of bending at the two consecutive reflecting surfaces.

Accordingly, it is preferable to arrange the prism optical system according to the present invention as follows. The prism optical system comprises three reflecting surfaces and has, in order in which light rays pass from the object side, a first transmitting surface, a first reflecting surface, a second reflecting surface, a third reflecting surface, and a second transmitting surface. When the axial principal ray is projected onto a plane defined by three points at which the axial principal ray impinges on the first transmitting surface, the first reflecting surface and the second reflecting surface, the projected axial principal ray forms an optical path that bends at two consecutive reflecting surfaces in the same direction with respect to the direction of travel of the rays and bends at the other reflecting surface in a direction different from the direction of bending at the two reflecting surfaces.

In the above-described optical path, the two consecutive reflecting surfaces, at which the axial principal ray bends in the same direction, should preferably be the first reflecting surface and the second reflecting surface. With this arrangement, it is possible to reduce the size, particularly the size in the direction of the optical axis entering the prism optical system. Therefore, the arrangement is particularly suitable for a finder optical system, an image pickup optical system, etc. of cameras.

In the above-described optical path, it is particularly preferable that the two consecutive reflecting surfaces, at which the axial principal ray bends in the same direction, should be the second reflecting surface and the third reflecting surface. With this arrangement, it is possible to reduce the size, particularly the size in a direction perpendicular to the direction of the entering optical axis. Therefore, the arrangement is particularly suitable for binoculars and the like.

It is possible to attain a reduction in size and an improvement in performance by setting an appropriate optical path using three reflecting surfaces as stated above. However, when the present invention is used in an image-forming optical system, for example, there are cases where satisfactory performance cannot be obtained, depending upon the position of an aperture of the optical system.

In an ordinary refracting optical system or the like, it is easy to place an aperture, e.g. an aperture stop, between lenses. In a prism optical system, however, the prism is filled therein with a medium. Therefore, in order to place an aperture in an intermediate portion of the optical path, it is necessary to divide the prism so that an aperture stop can be placed, or it is necessary to provide the prism with a groove or the like to define an aperture. In the present invention also, the prism can be divided to place an aperture. However, if the prism is divided, performance degradation due to assembling errors is likely to occur. Therefore, division of the prism is unfavorable from the viewpoint of performance. Formation of a groove in the prism to define an aperture is also unfavorable from the viewpoint of performance because there are influences of irregular reflection and scattered light in actual practice. In a case where an aperture is defined by a groove, because the aperture cannot be stopped down physically, another member such as an ND filter is needed, resulting in a rise in cost. Thus, placing an aperture in an intermediate portion of the optical path causes various problems unfavorably.

If an aperture is placed outside the prism, it becomes unnecessary to divide the prism or to form a groove. Accordingly, the above-described problems relating to performance can be solved. Therefore, it is desirable to place the three reflecting surfaces of the prism between the aperture of the optical system and the object plane or between the aperture and the image plane.

As has been stated above, adopting the arrangement of the present invention makes it possible to obtain a prism optical system of high performance despite its compact and thin structure in comparison to the conventional arrangement.

The following is a description of the arrangement of the prism optical system that allows the object of the present invention to be effectively attained.

In the prism optical system according to the present invention, the transmitting surfaces and the reflecting surfaces can be readily formed from surfaces independent of each other by using the above-described optical path. It is also possible in the present invention to form at least one reflecting surface from a mutual reflecting surface. However, using a mutual reflecting surface does not always allow the size of the prism optical system to be reduced to a considerable extent. Performance degradation and reduction in freedom for the exit direction caused by the use of a mutual reflecting surface are greater than the reduction in size. Therefore, it is not preferable to use a mutual reflecting surface. Accordingly, in view of the balance of the size and the performance, it is most desirable to form all the reflecting surfaces independently of the transmitting surfaces.

It is deemed possible to construct the prism in a compact form by making the projected axial principal ray cross itself in the prism to thereby fold the optical path. To the contrary, folding the optical path in a compact form causes the effective portions of the reflecting surfaces to become likely to overlap each other unfavorably. Particularly, when there are three reflecting surfaces as in the present invention, it is necessary to increase the spacing between the reflecting surfaces in order to make them independent reflecting surfaces. This is disadvantageous from the viewpoint of aberration correction. Accordingly, it is preferable to arrange the optical system so that the projected axial principal ray does not cross itself in the prism.

The following is a description of the arrangements of two of the reflecting surfaces at which the projected axial principal ray bends in the same direction consecutively.

In the present invention, a reduction in size is achieved by folding the optical path with two reflecting surfaces at which the projected axial principal ray bends in the same direction consecutively. Therefore, the optical path affects the size of the prism. Accordingly, it is necessary to appropriately set the angle formed between the entrance direction to the two reflecting surfaces and the exit direction therefrom. For this reason, it is preferable to satisfy the following condition:

$$0° \leq \theta < 45°$$ (1)

where $\theta$ is the angle formed between the projected axial principal ray incident on the first reflecting surface of the two reflecting surfaces at which the projected axial principal ray bends in the same direction consecutively and the projected axial principal ray exiting from the second reflecting surface of the two reflecting surfaces. It should be noted that e is a smaller angle of two angles formed between the projected axial principal ray incident on the first reflecting surface and the projected axial principal ray exiting from the second reflecting surface. Therefore, the angle $\theta$ ranges from 0° to less than 180°.

If $\theta$ is not smaller than the upper limit of the condition (1), i.e. 45°, the projected axial principal ray may cross itself undesirably, or the prism becomes undesirably large in size.

It is even more desirable to satisfy the following condition:

$$0° \leq \theta < 30°$$ (2)

It is preferable from the viewpoint of performance to minimize the reflection angle at a reflecting surface with a power because the smaller the reflection angle, the smaller the amount of decentration aberrations-produced by the reflecting surface. However, at two reflecting surfaces at which the projected axial principal ray bends in the same direction consecutively, it is necessary to make the reflection angle relatively large so that the effective portions of the two reflecting surfaces do not overlap the effective portion of another reflecting or transmitting surface. From the viewpoint of performance, however, it is preferable to minimize the reflection angle at at least one of the two reflecting surfaces, at which the projected axial principal ray bends in the same direction consecutively, to thereby minimize the amount of decentration aberrations produced by the reflecting surface. Accordingly, it is preferable that at least one of the two reflecting surfaces should satisfy the following condition:

$$10° < \phi_1 < 70°$$ (3)

where $\phi_1$ is the reflection angle of the axial principal ray at the reflecting surfaces at which the projected axial principal ray bends in the same direction consecutively.

If $\phi_1$ is not smaller than the upper limit of the condition (3), i.e. 70°, the amount of decentration aberrations produced by this surface becomes unfavorably large, causing the performance to be degraded. If $\phi_1$ is not larger than the lower limit, i.e. 10°, the effective portion of the reflecting surface undesirably overlaps the effective portion of another reflecting or transmitting surface. Consequently, it becomes impossible to construct the desired prism.

It is even more desirable to satisfy the following condition:

$$20° < \phi_1 < 60° \quad (4)$$

As has been stated above, the two reflecting surfaces at which the projected axial principal ray bends in the same direction consecutively need relatively large reflection angles. Therefore, the effective portions of these reflecting surfaces also tend to increase in size. For this reason, to separate the effective portions of the two reflecting surfaces from each other, it is preferable that the spacing between the two reflecting surfaces should satisfy the following condition:

$$0.1 < |d/f| < 3 \quad (5)$$

where d is the distance between the two reflecting surfaces along the axial principal ray, and f is the focal length of the entire prism optical system.

If $|d/f|$ is not smaller than the upper limit of the condition (5), i.e. 3, it becomes necessary to increase the optical path length. This causes the prism to become undesirably large in size. If $|d/f|$ is not larger than the lower limit, i.e. 0.1, it becomes difficult to form the reflecting surfaces as independent surfaces.

It is even more desirable to satisfy the following condition:

$$0.3 < |d/f| < 2 \quad (6)$$

Regarding the reflecting surface at which the projected axial principal ray bends in a direction different from the direction of bending at the above-described two reflecting surfaces, it is also preferable to minimize the reflection angle at the reflecting surface because the amount of decentration aberrations produced by this surface is reduced by doing so. Accordingly, it is preferable to satisfy the following condition:

$$20° < \phi_2 < 70° \quad (7)$$

where $\phi_2$ is the reflection angle of the axial principal ray at the reflecting surface at which the projected axial principal ray bends in a direction. different from the direction of bending at the two other reflecting surfaces.

If $\phi_2$ is not smaller than the upper limit of the con0dition (7), i.e. 70°, the amount of decentration aberrations produced by this surface becomes unfavorably large, causing the performance to be degraded. If $\phi_2$ is not larger than the lower limit, i.e. 20°, the effective portion of the reflecting surface undesirably overlaps the effective portion of another reflecting surface. Consequently, it becomes impossible to construct the desired prism.

It is even more desirable to satisfy the following condition:

$$30° < \phi_2 < 60° \quad (8)$$

Next, the details of the optical path will be described.

In the conventional optical system, the size in the direction of the optical axis entering the optical system, which depends on the focal length and the structural length of the lens, may give rise to a problem. It is deemed that the size of the prism optical system can be reduced because the optical axis is folded. However, when another optical system is connected to the prism optical system or the back focus is long, the size in the direction of the entering optical axis cannot be reduced unless consideration is given to the exit direction from the prism optical system. Therefore, in the prism optical system according to the present invention, it is preferable to set the exit direction of the prism optical system perpendicular to the entrance direction. By doing so, the size in the direction of the entering optical axis does not become large even in the above-described case, and a compact optical system can be obtained. However, there are cases where it is preferable not to set the exit direction completely perpendicular to the entrance direction from the viewpoint of placing another member. Accordingly, it is preferable that the angle formed between the projected axial principal ray entering the prism and the projected axial principal ray exiting from the prism should satisfy the following condition:

$$45° < \omega < 135° \quad (9)$$

where ω is the angle formed between the projected axial principal ray entering the prism and the projected axial principal ray exiting from the prism. It should be noted that ω is a smaller angle of two angles formed between the projected axial principal ray entering the prism and the projected axial principal ray exiting from the prism. Therefore, the angle ω ranges from 0° to less than 180°.

If the angle ω is not within the range defined by the condition (9), it becomes impossible to reduce the size in the entrance direction of the prism optical system.

It is even more desirable to satisfy the following condition:

$$60° < \omega < 120° \quad (10)$$

In the foregoing, the optical path of the prism optical system is defined by the two-dimensional projected axial principal ray. In the following, a three-dimensional optical path will be described. Even when a reduction in size is achieved by using the optical path of the prism optical system according to the present invention, if the optical path is arranged three-dimensionally, a dead space is likely to occur when the optical system is placed, in general, in comparison to a case where the optical axis lies in one and the same plane. Consequently, a camera or the like that is equipped with the optical system becomes undesirably large in size. Therefore, it is most desirable that the optical path of the prism optical system according to the present invention should lie in one and the same plane. However, there are cases where the optical system becomes compact in size as a whole by using a three-dimensional optical path to place another member. Accordingly, it is preferable that the angle of the axial principal ray exiting from each of the second and third reflecting surfaces to the plane in which the projected axial principal ray is set should satisfy the following conditions:

$$0° \leq \alpha_2 < 30° \quad (11)$$

$$0° \leq \alpha_3 < 30° \quad (12)$$

where $a_2$ is the angle formed between the plane defined by three points at which the axial principal ray impinges on the first transmitting surface, the first reflecting surface and the second reflecting surface and the axial principal ray exiting from the second reflecting surface, and $\alpha_3$ is the angle formed between the plane defined by three points at which the axial principal ray impinges on the first transmitting surface, the first reflecting surface and the second reflecting surface and the axial principal ray exiting from the third reflecting surface. For each of the angles $\alpha_2$ and $\alpha_3$, a smaller angle of two angles formed with respect to the above-described reference plane is taken. Therefore, the angles $\alpha_2$ and $\alpha_3$ range from 0° to less than 90°.

If the angles $\alpha_2$ and $\alpha 3$ are not smaller than the upper limits of the conditions (11) and (12), i.e. 30°, a dead space occurs, and the optical system becomes undesirably large in size.

It is even more desirable to satisfy the following conditions:

$$0° \leq \alpha_2 < 15° \quad (13)$$

$$0° \leq \alpha_3 < 15° \quad (14)$$

If the prism optical system according to the present invention is arranged so that all the surfaces have negative powers, the prism becomes undesirably large in size because the light beam diverges. Accordingly, it is not always possible to attain a reduction in size even if the optical axis is folded by using reflecting surfaces. Therefore, it is preferable to give positive powers to at least two reflecting surfaces.

Furthermore, because the prism optical system according to the present invention has three reflecting surfaces, a loss of light quantity caused by reflection may give rise to a problem. Therefore, at least one of the three reflecting surfaces may be formed into a totally reflecting surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
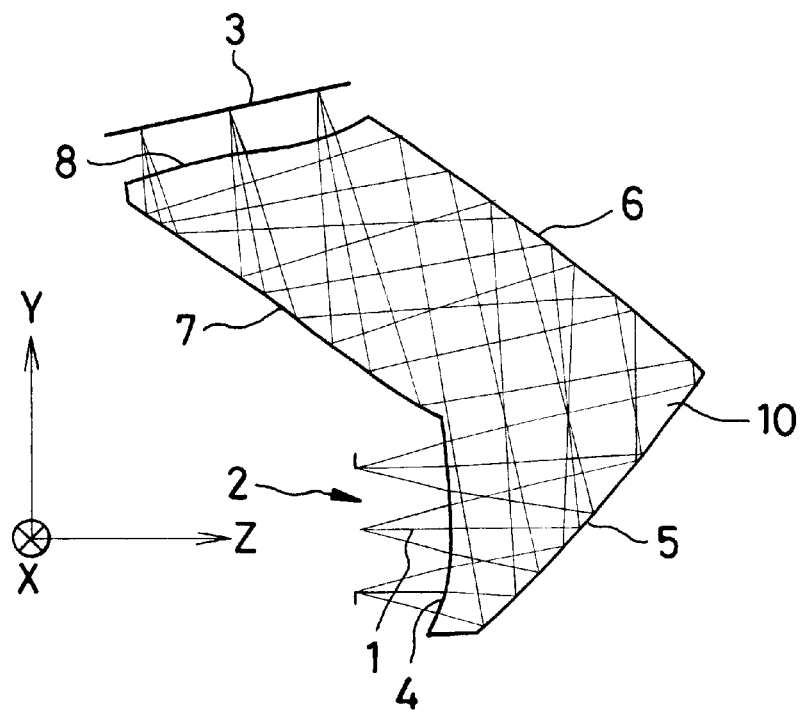
FIG. 1 is a sectional view taken along the YZ-plane, showing a prism optical system according to Example 1 of the present invention.

Numerical Examples 1 to 5 of the image-forming optical system according to the present invention will be described below. It should be noted that constituent parameters of each example will be shown later. In each example, as shown in FIGS. 1 to 5, the center of a stop 2 (an entrance pupil 2' in Example 3) is defined as the origin of a decentered optical system, and an axial principal ray 1 is defined by a ray emanating from the center of an object (not shown in the figures) and passing through the center of the stop 2. A Z-axis is taken in the direction in which the axial principal ray 1 travels from the object center to a first surface 4 of the optical system. A plane containing the Z-axis and the center of an image plane 3 is defined as a YZ-plane. A Y-axis is taken in a direction that is in a plane in which rays are folded by the surfaces of the optical system and that perpendicularly intersects the Z-axis in the YZ-plane. The direction in which the Z-axis extends from the object point toward the first surface 4 of the optical system is defined as a positive direction of the Z-axis. The upward direction as viewed in the figures is defined as a positive direction of the Y-axis. An axis that constitutes a right-handed orthogonal coordinate system in combination with the Y- and Z-axes is defined as an X-axis.

In Examples 1 to 5, decentration of each surface is made in the YZ-plane, and one and only plane of symmetry of each rotationally asymmetric free-form surface is the YZ-plane.

Regarding decentered surfaces, each surface is given displacements in the X-, Y- and Z-axis directions (x, y and z, respectively) of the vertex position of the surface from the origin of the optical system, and tilt angles (degrees) of the center axis of the surface [the Z-axis of the above equation (A) in regard to free-form surfaces; the Z-axis of the following equation (B) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive γ means clockwise rotation relative to the positive direction of the Z-axis.

Among optical surfaces constituting the optical system in each example, a specific surface and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (A). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (B)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (C). The Z-axis of the defining equation (C) is the axis of Zernike polynomial. A rotationally asymmetric surface is defined by polar coordinates of the height of the Z-axis with respect to the XY-plane. In the equation (C), A is the distance from the Z-axis in the XY-plane, and R is the azimuth angle about the Z-axis, which is expressed by the angle of rotation measured from the Z-axis.

$$x=R\times\cos(A)$$

$$y=R\times\sin(A)$$

$$Z=D_2$$

$$+D_3R\cos(A)+D_4R\sin(A)$$

$$+D_5R^2\cos(2A)+D_6(R^2-1)+D_7R^2\sin(2A)$$

$$+D_8R^3\cos(3A)+D_9(3R^3-2R)\cos(A)$$

$$+D_{10}(3R^3-2R)\sin(A)+D_{11}R^3\sin(3A)$$

$$+D_{12}R^4\cos(4A)+D_{13}(4R^4-3R^2)\cos(2A)$$

$$+D_{14}(6R^4-6R^2+1)+D_{15}(4R^4-3R^2)\sin(2A)$$

$$+D_{16}R^4\sin(4A)$$

$$+D_{17}R^5\cos(5A)+D_{18}(5R^5-4R^3)\cos(3A)$$

$$+D_{19}(10R^5-12R^3+3R)\cos(A)$$

$$+D_{20}(10R^5-12R^3+3R)\sin(A)$$

$$+D_{21}(5R^5-4R^3)\sin(3A)+D_{22}R^5\sin(5A)$$

$$+D_{23}R^6\cos(6A)+D_{24}(6R^6-5R^4)\cos(4A)$$

$$+D_{25}(15R^6-20R^4+6R^2)\cos(2A)$$

$$+D_{26}(20R^6-30R^4+12R^2-1)$$

$$+D_{27}(15R^6-20R^4+6R^2)\sin(2A)$$

$$+D_{28}(6R^6-5R^4)\sin(4A)+D_{29}R^6\sin(6A). \quad (C)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (D):

$$Z=\Sigma\Sigma C_{nm}XY$$

Assuming that k=7 (polynomial of degree 7), for example, a free-form surface is expressed by an expanded form of the above equation as follows:

$$Z=C_2$$

$$+C_3y+C_4|x|$$

$$+C_5y^2+C_6y|x|+C_7x^2$$

$$+C_8y^3+C_9y^2|x|+C_{10}yx^2+C_{11}|x^3|$$

$$+C_{12}y^4+C_{13}y^3|x|+C_{14}y^2x^2$$

$$+C_{15}y|x^3|+C_{16}x^4$$

$$+C_{17}y^5+C_{18}y^4|x|+C_{19}y^3x^2+C_{20}y^2|x^3|$$

$$+C_{21}yx^4+C_{22}|x^5|$$

$$+C_{23}y^6+C_{24}y^5|x|+C_{25}y^4x^2+C_{26}y^3|x^3|$$

$$+C_{27}y^2x^4+C_{28}y|x^5I +C_{29}x^6$$

$$+C_{30}y^7+C_{31}y^6|x|+C_{32}y^5x^2+C_{33}y^4|x^3|$$

$$+C_{34}y^3x^4+C_{35}y^2|x^5|+C_{36}yx^6+C_{37}|x^7| \quad (D)$$

Although in the examples of the present invention the surface configuration is expressed by a free-form surface using the above equation (A), it should be noted that the same advantageous effect can be obtained by using the above equation (C) or (D).

Although the prisms and refracting lens of the optical systems according to Examples 1 to 5 are formed by using a plastic material, it should be noted that the prisms and the refracting lens may be made of glass. When a plastic material is used, in particular, it is desirable to use. a material of low moisture absorption because performance degradation caused by environmental changes is minimized by the use of such a material.

EXAMPLE 1

FIG. 1 is a sectional view of Example 1 taken along the YZ-plane containing the axial principal ray.

Example 1 is an image-forming optical system, in which photographic field angles are as follows: The horizontal half field angle is 19.28°, and the vertical half field angle is 14.70°. F-number is 2.8. The image height is 2.45×1.84 millimeters (diagonal image height: 3.06 millimeters). In terms of the focal length of a rotationally symmetric optical system, the X-axis direction focal length is equivalent to 7.6 millimeters, and the Y-axis direction focal length is equivalent to 7.1 millimeters.

Constituent parameters of Example 1 will be shown later. In the constituent parameters, free-form surfaces are denoted by "FFS", and rotationally symmetric aspherical surfaces are denoted by "ASS". The same shall apply to the subsequent examples.

Example 1 comprises only one prism 10 of positive power. The prism 10 has, in order in which light passes from the object side, a first transmitting surface 4, a first reflecting surface 5 of positive power, a second reflecting surface 6 of positive power, a third reflecting surface 7, and a second transmitting surface 8. The first to third reflecting surfaces 5 to 7 are all optical surfaces independent of the first transmitting surface 4 and the second transmitting surface 8. In this example, all the surfaces, i.e. the first transmitting surface 4, the second transmitting surface 8, and the first to third reflecting surfaces 5 to 7 are formed from decentered free-form surfaces. In Example 1, the prism 10 is arranged so that the central principal ray bends in the same direction at the first reflecting surface 5 and the second reflecting surface 6. With respect to all the optical surfaces, points at which the central principal ray impinges on the surfaces lie in the same plane.

EXAMPLE 2

Figure 2:
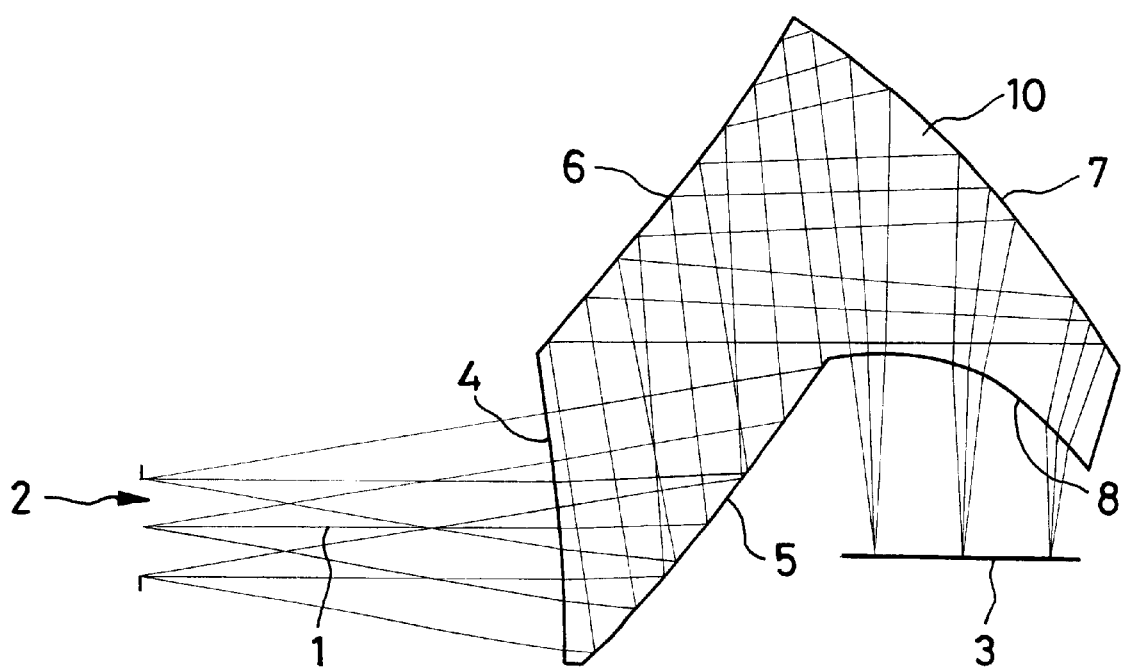
FIG. 2 is a sectional view taken along the YZ-plane, showing a prism optical system according to Example 2 of the present invention.

FIG. 2 is a sectional view of Example 2 taken along the YZ-plane containing the axial principal ray.

Example 2 is an ocular optical system, in which field angles are as follows: The horizontal half field angle is 6.64°, and the vertical half field angle is 9.55°. The pupil diameter is 4 millimeters. The size of an image display device placed in the image plane 3 or the size of an intermediate image formed by an objective optical system is 2.53×3.66 millimeters (diagonal image height: 4.45 millimeters). In terms of the focal length of a rotationally symmetric optical system, both the X- and Y-axis direction focal lengths are equivalent to 21.9 millimeters.

Example 2 is designed on the basis of backward ray tracing. Therefore, in the constituent parameters (shown later) and in the ray diagram of FIG. 2, rays actually travel from the image plane 3 toward the object side. Therefore, the object point is set at 2000 millimeters on the image side so that a virtual image is formed at −0.5 m$^{-1}$ from the pupil plane 2 in forward ray tracing. The following description will be made on the basis of forward ray tracing. The optical system comprises only one prism 10 of positive power. The prism 10 has, in order in which light passes from the object side (i.e. from the image plane 3 in the constituent parameters and in the ray diagram), a first transmitting surface 8 of negative power, a first reflecting surface 7 of positive power, a second reflecting surface 6 having a positive power in the X-axis direction and a negative power in the Y-axis direction, a third reflecting surface 5 having a negative power in the X-axis direction and a positive power in the Y-axis direction, and a second transmitting surface 4. The first to third reflecting surfaces 7 to 5 are all optical surfaces independent of the first transmitting surface 8 and the second transmitting surface 4. In this example, all the surfaces, i.e. the first transmitting surface 8, the second transmitting surface 4, and the first to third reflecting surfaces 7 to 5 are formed from decentered free-form surfaces. In Example 2, the prism 10 is arranged so that the central principal ray bends in the same, direction at the first reflecting surface 7 and the second reflecting surface 6. With respect to all the optical surfaces, points at which the central principal ray impinges on the surfaces lie in the same plane.

EXAMPLE 3

Figure 3:
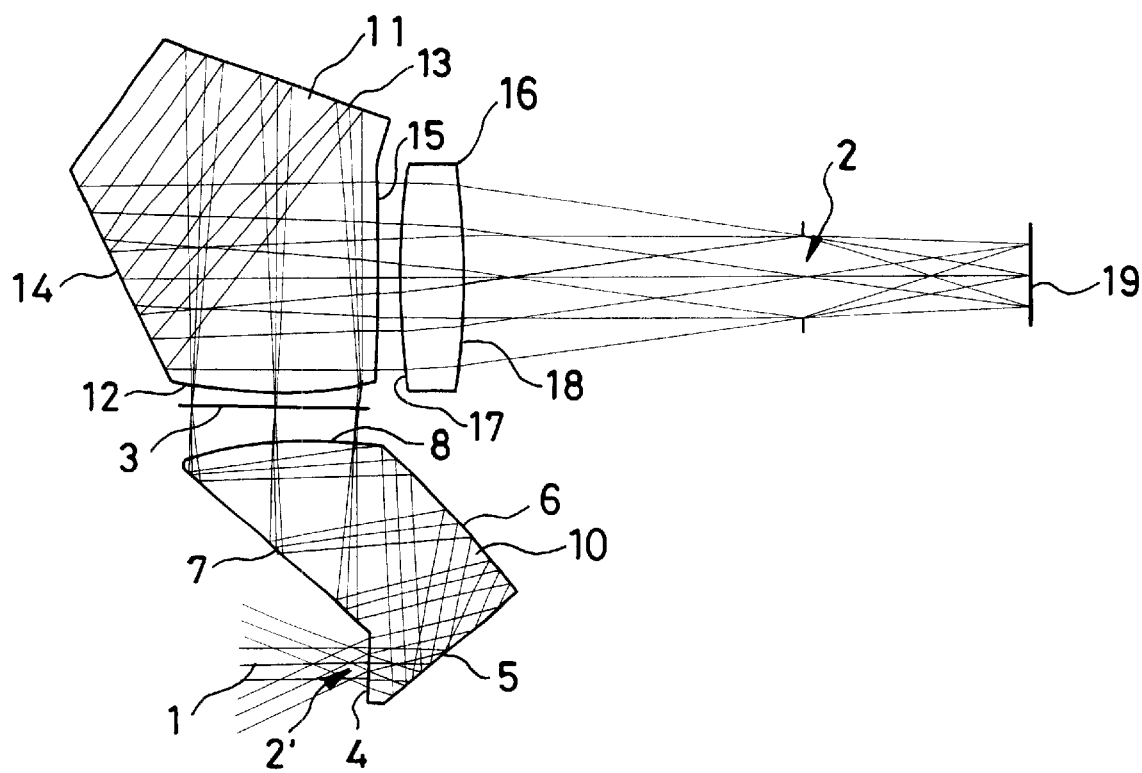
FIG. 3 is a sectional view taken along the YZ-plane, showing a prism optical system according to Example 3 of the present invention.

FIG. 3 is a sectional view of Example 3 taken along the YZ-plane containing the axial principal ray.

Example 3 is a real-image finder optical system, in which field angles are as follows: The horizontal half field angle is 16.050, and the vertical half field angle is 22.59°. The pupil diameter is 4 millimeters. The size of an intermediate image is 2.53×3.66 millimeters (diagonal image height: 4.45 millimeters). The finder magnification is 0.34×. In terms of the focal length of a rotationally symmetric optical system, the X-axis direction focal length of the objective optical system comprising the prism 10 is equivalent to 8.8 millimeters, and the Y-axis direction focal length thereof is equivalent to 8.9 millimeters. The X-axis direction focal length of the ocular optical system comprising a pentagonal prism 11 and a lens 16 is equivalent to 26.0 millimeters, and the Y-axis direction focal length is equivalent to 25.5 millimeters. In this example, the optical system is arranged to form a virtual image at −0.5 m$^{-1}$ from a pupil plane 2' (2000 millimeters on the object side). In the constituent parameters (shown later), however, the optical system is arranged in the form of an image-forming system by placing an ideal lens having a focal length of 10 millimeters in the stop plane 2.

Example 3 has an objective optical system comprising only one prism 10 of positive power according to the present invention. The prism 10 has, in order in which light passes from the object side, a first transmitting surface 4 of negative power, a first reflecting surface 5 of positive power, a second reflecting surface 6 of positive power, a third reflecting surface 7 of negative power, and a second transmitting surface 8 of positive power. Example 3 further has a field mask placed in an intermediate image plane 3 to define the range of a visual field, and an ocular optical system including a pentagonal prism 11. The pentagonal prism 11 has a first transmitting surface 12 of positive power, a first reflecting surface 13 formed from a roof surface, a second reflecting surface 14, and a second transmitting surface 15 of positive power. The ocular optical system further includes a positive lens 16 in which an object-side surface 17 has a rotationally symmetric aspherical surface and a viewing-side surface 18 has a spherical surface.

In this example, the first to third reflecting surfaces 5 to 7 of the prism 10 are all optical surfaces independent of the first transmitting surface 4 and the second transmitting surface 8, and all the surfaces of the prism 10, i.e. the first transmitting surface 4, the second transmitting surface 8, and the first to third reflecting surfaces 5 to 7 are formed from decentered free-form surfaces. Although the second reflecting surface 14 of the pentagonal prism 11 is a plane surface, it may be formed from a free-form surface.

In Example 3, the prism 10 is arranged so that the central principal ray bends in the same direction at the first reflecting surface 5 and the second reflecting surface 6. With respect to all the optical surfaces, points at which the central principal ray impinges on the surfaces lie in the same plane.

It should be noted that although the image plane 17 is perpendicular to the Z-axis, it may be tilted at several degrees for parallax correction.

EXAMPLE 4

Figure 4:
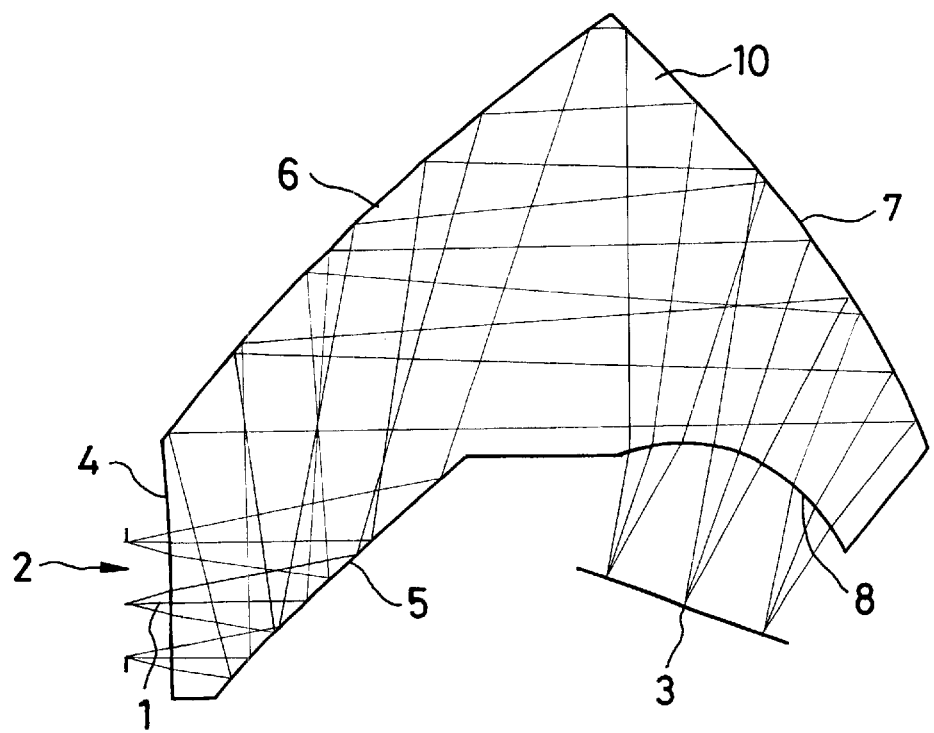
FIG. 4 is a sectional view taken along the YZ-plane, showing a prism optical system according to Example 4 of the present invention.

FIG. 4 is a sectional view of Example 4 taken along the YZ-plane containing the axial principal ray.

Example 4 is an image-forming optical system, in which photographic field angles are as follows: The horizontal half field angle is 19.28°, and the vertical half field angle is 14.70°. F-number is 2.8. The image height is 2.45×1.84 millimeters (diagonal image height: 3.06 millimeters). In terms of the focal length of a rotationally symmetric optical system, the X-axis direction focal length is equivalent to 7.6 millimeters, and the Y-axis direction focal length is equivalent to 7.3 millimeters.

Example 4 comprises only one prism 10 of positive power. The prism 10 has, in order in which light passes from the object side, a first transmitting surface 4, a first reflecting surface 5 of negative power, a second reflecting surface 6 of positive power, a third reflecting surface 7 of positive power, and a second transmitting surface 8 of negative power. The first to third reflecting surfaces 7 to 5 are all optical surfaces independent of the first transmitting surface 8 and the second transmitting surface 4. In this example, all the surfaces, i.e. the first transmitting surface 8, the second transmitting surface 4, and the first to third reflecting surfaces 7 to 5 are formed from decentered free-form surfaces. In Example 4, the prism 10 is arranged so that the central principal ray bends in the same direction at the second reflecting surface 6 and the third reflecting surface 7. With respect to all the optical surfaces, points at which the central principal ray impinges on the surfaces lie in the same plane.

EXAMPLE 5

Figure 5:
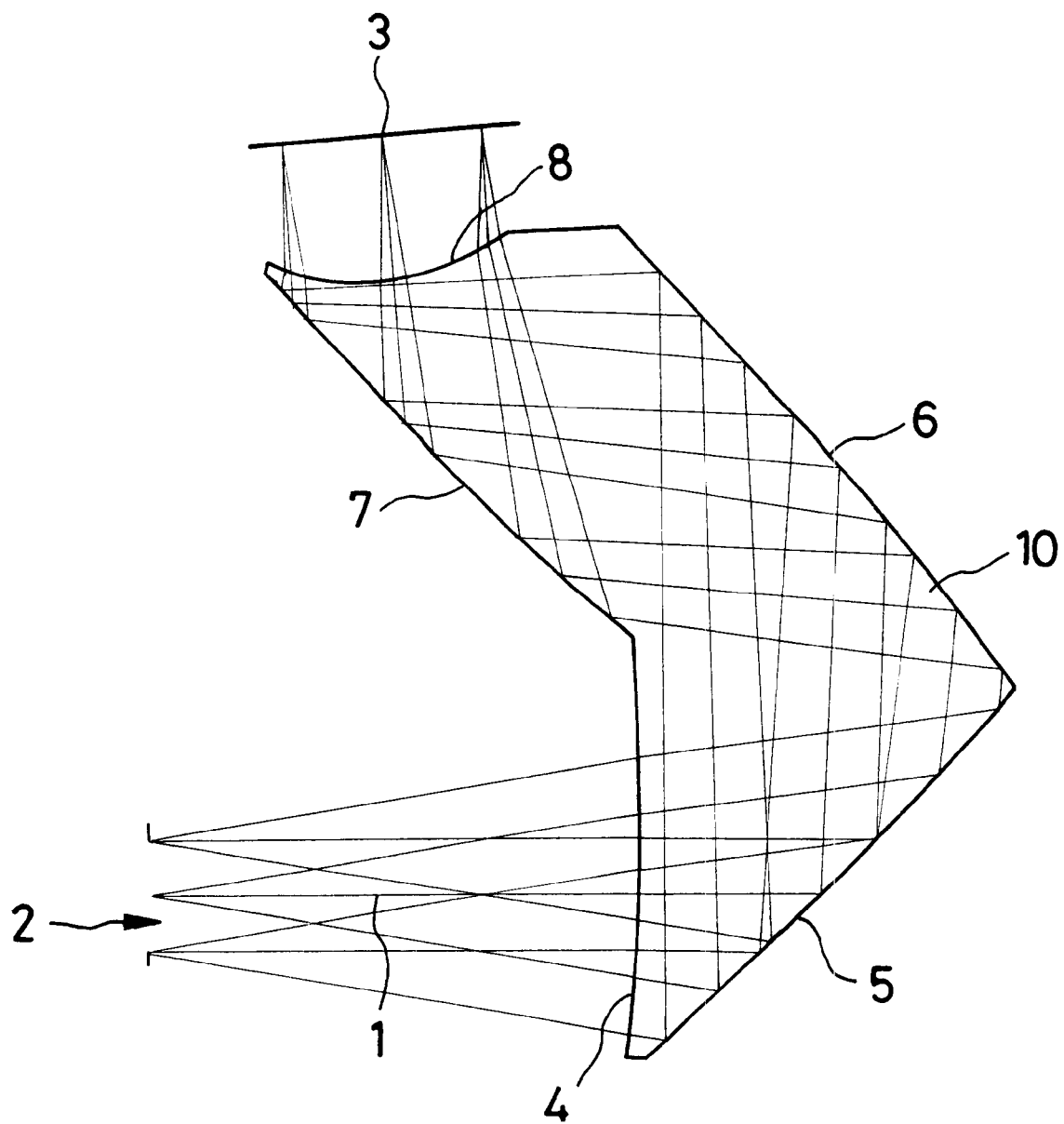
FIG. 5 is a sectional view taken along the YZ-plane, showing a prism optical system according to Example 5 of the present invention.
Figure 6:
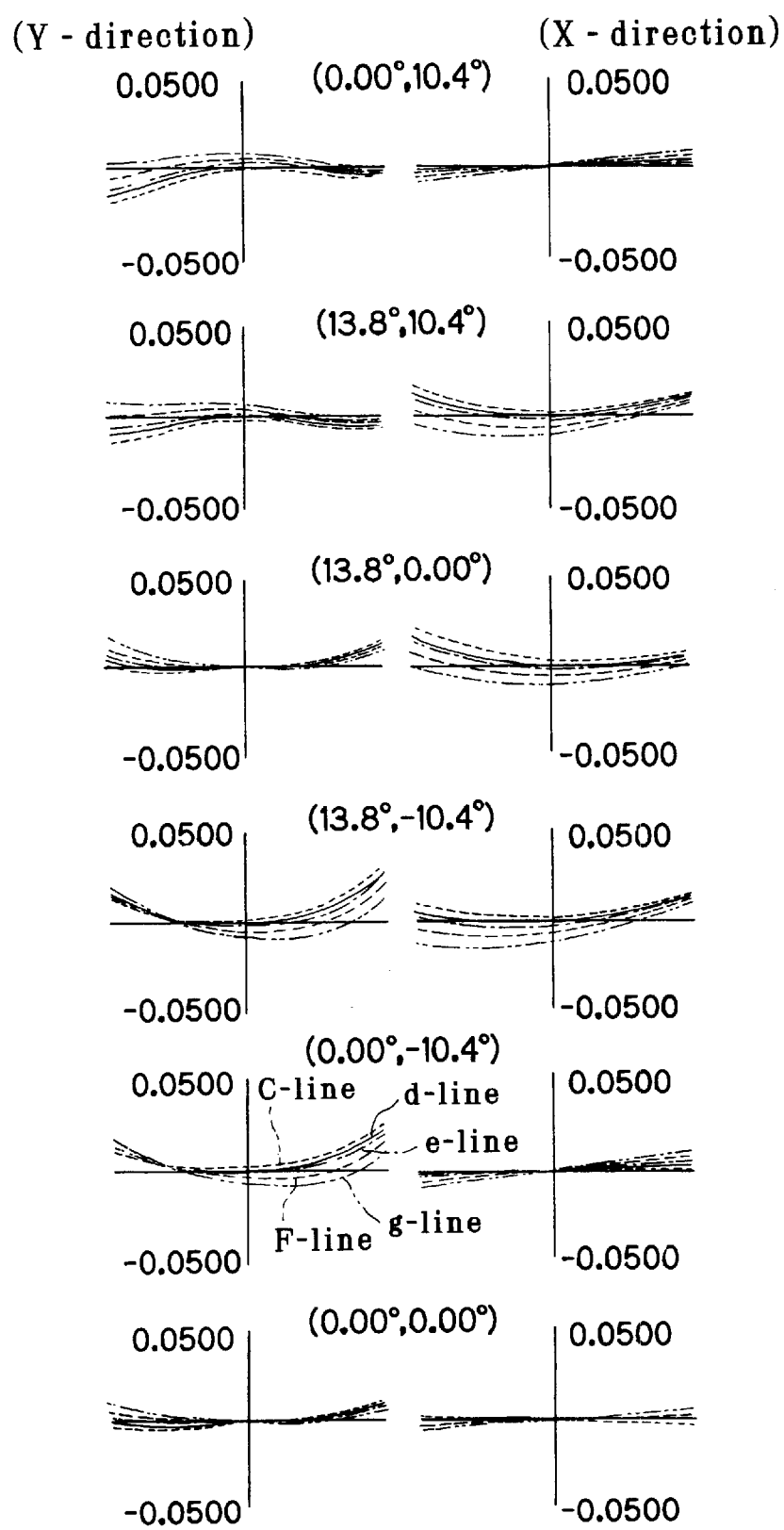
FIG. 6 is an aberrational diagram showing lateral aberrations in the prism optical system according to Example 1.
Figure 7:
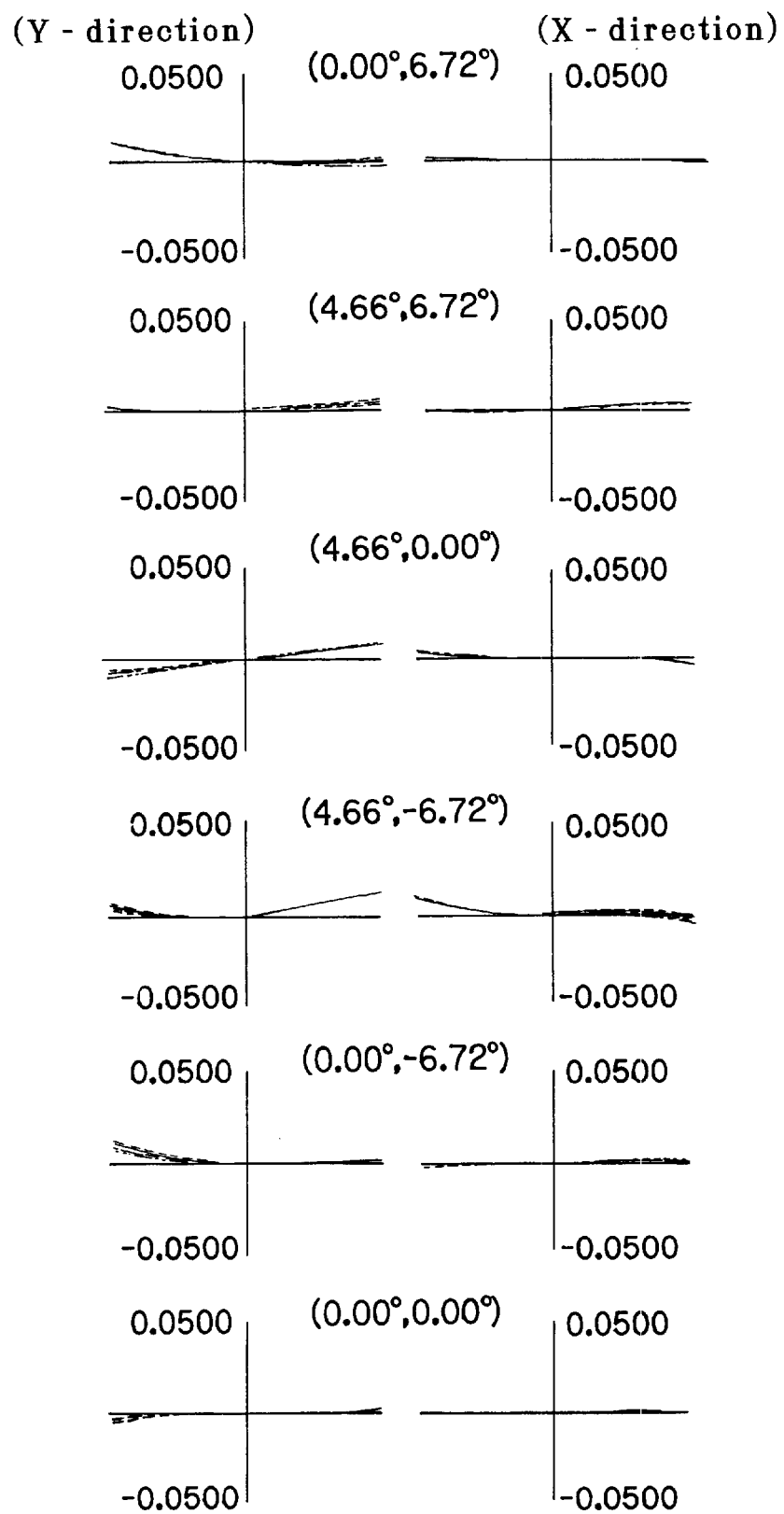
FIG. 7 is an aberrational diagram showing lateral aberrations in the prism optical system according to Example 2.
Figure 8:
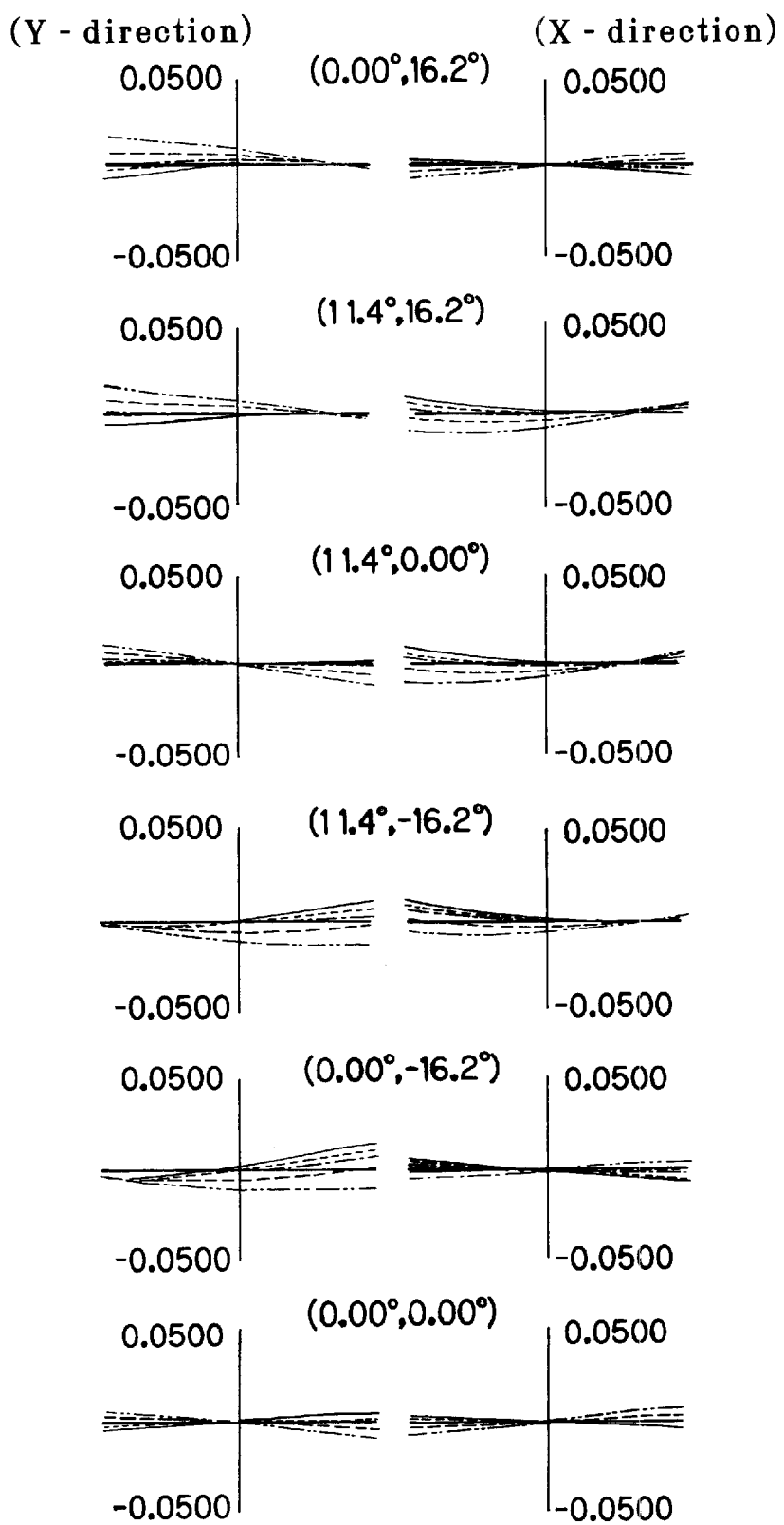
FIG. 8 is an aberrational diagram showing lateral aberrations in the prism optical system according to Example 3.
Figure 9:
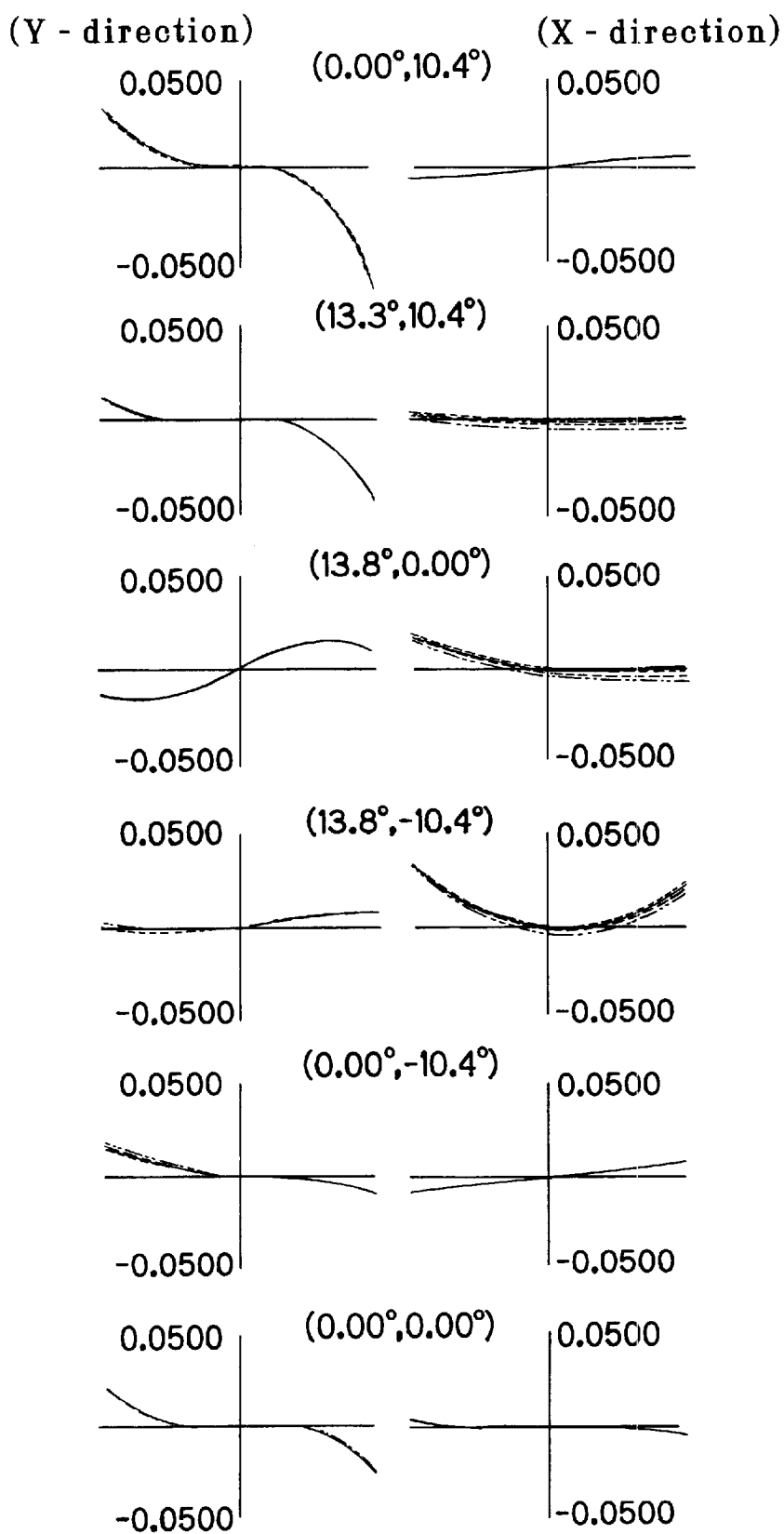
FIG. 9 is an aberrational diagram showing lateral aberrations in the prism optical system according to Example 4.
Figure 10:
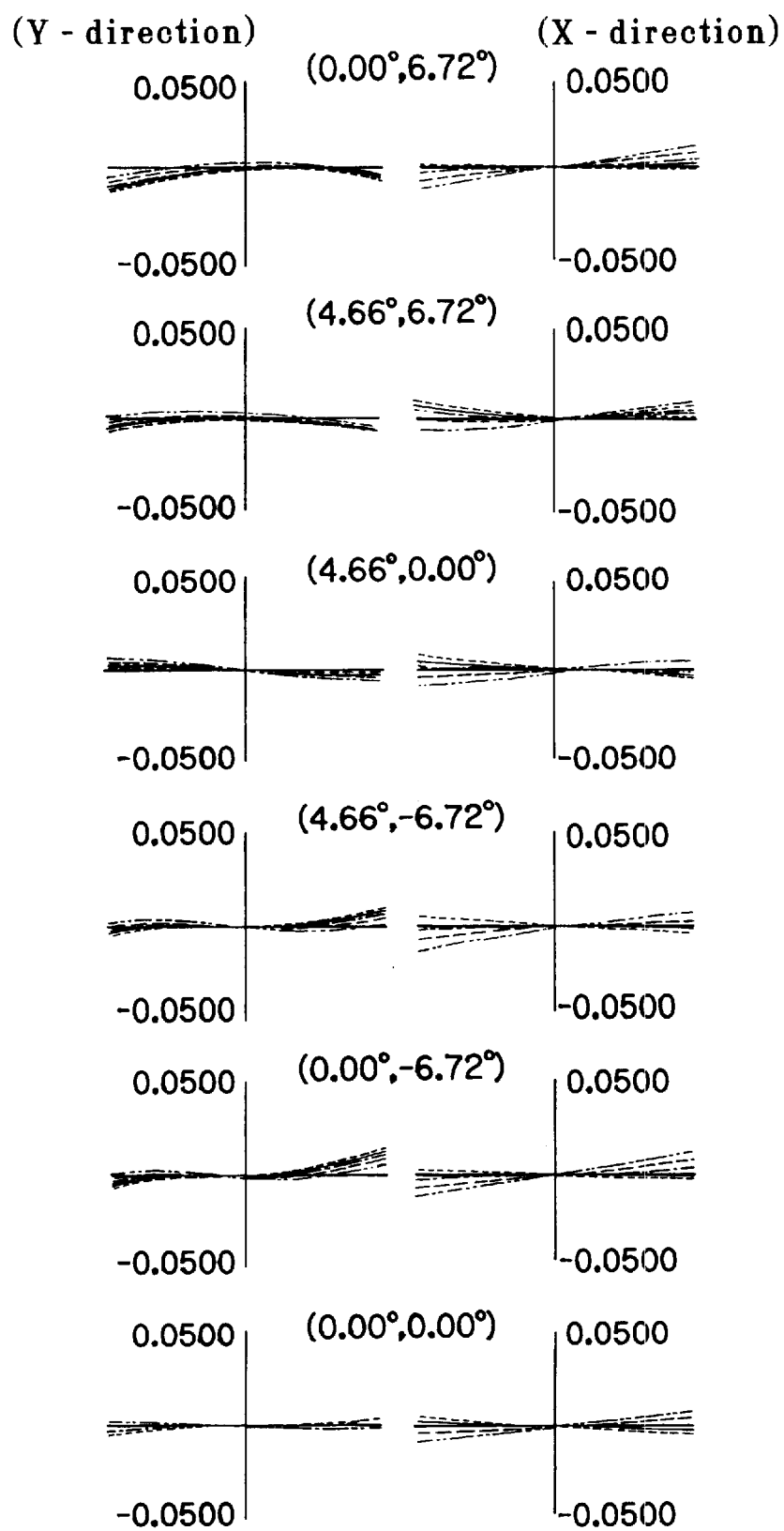
FIG. 10 is an aberrational diagram showing lateral aberrations in the prism optical system according to Example 5.

FIG. 5 is a sectional view of Example 5 taken along the YZ-plane containing the axial principal ray.

Example 5 is an ocular optical system, in which field angles are as follows: The horizontal half field angle is 6.64°, and the vertical half field angle is 9.55°. The pupil diameter is 4 millimeters. The size of an image display device placed in the image plane 3 or the size of an intermediate image formed by an objective optical system is 2.53×3.66 millimeters (diagonal image height: 4.45 millimeters). In terms of the focal length of a rotationally symmetric optical system, the X-axis direction focal length is equivalent to 21.8 millimeters, and the Y-axis direction focal length is equivalent to 22.0 millimeters.

Example 5 is designed on the basis of backward ray tracing. Therefore, in the constituent parameters (shown later) and in the ray diagram of FIG. 5, rays actually travel from the image plane 3 toward the object side. Therefore, the object point is set at 2000 millimeters on the image side so that a virtual image is formed at $-0.5$ m$^{-1}$ from the pupil plane 2 in forward ray tracing. The following description will be made on the basis of forward ray tracing. The optical system comprises only one prism of positive power. The prism 10 has, in order in which light passes from the object side (i.e. from the image plane 3 in the constituent parameters and in the ray diagram), a first transmitting surface 8 of negative power, a first reflecting surface 7 of positive power, a second reflecting surface 6 of positive power, a third reflecting surface 5 of positive power, and a second transmitting surface 4 of negative power. The first to third reflecting surfaces 7 to 5 are all optical surfaces independent of the first transmitting surface 8 and the second transmitting surface 4. In Example 5, the prism 10 is arranged so that the central principal ray bends in the same direction at the second reflecting surface 6 and the third reflecting surface 7. With respect to all the optical surfaces, points at which the central principal ray impinges on the surfaces lie in the same plane. In this example, all the surfaces, i.e. the first transmitting surface 8, the second transmitting surface 4, and the first to third reflecting surfaces 7 to 5 are formed from decentered free-form surfaces.

Constituent parameters in the foregoing Examples 1 to 5 are shown below. In the tables below: "FFS" denotes a free-form surface; "ASS" denotes a rotationally symmetric aspherical surface; and "IIP" denotes an intermediate image plane.

EXAMPLE 1

| Surface No. | Radius curvature | Surface seperation | Displacement and tilt | Refractive index | Abbe's No. |
|---|---|---|---|---|---|
| Object plane | ∞ | ∞ | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| Image plane | ∞ | | (6) | | |

FFS①
$C_4$ $-5.8090 \times 10^{-2}$ $C_6$ $-6.3869 \times 10^{-2}C_8$ $5.0638 \times 10^{-3}$
$C_{10}$ $1.1280 \times 10^{-2}$ $C_{11}$ $2.2465 \times 10^{-4}C_{13}$ $-1.2984 \times 10^{-3}$
$C_{15}$ $-1.8488 \times 10^{-3}$ $C_{17}$ $6.7028 \times 10^{-5}C_{19}$ $-7.1364 \times 10^{-5}$
$C_{21}$ $7.7943 \times 10^{-4}$ FFS②
$C_4$ $-1.9249 \times 10^{-2}$ $C_6$ $-1.2817 \times 10^{-2}C_8$ $8.3055 \times 10^{-4}$
$C_{10}$ $8.8361 \times 10^{-4}$ $C_{11}$ $5.3282 \times 10^{-5}C_{13}$ $-3.5658 \times 10^{-5}$
$C_{15}$ $-1.0932 \times 10^{-4}$ $C_{17}$ $-1.1752 \times 10^{-5}C_{19}$ $-4.5468 \times 10^{-6}$
$C_{21}$ $1.0427 \times 10^{-5}$ FFS③
$C_4$ $-2.8227 \times 10^{-2}$ $C_6$ $-1.0752 \times 10^{-2}C_8$ $-1.0902 \times 10^{-3}$
$C_{10}$ $-4.8273 \times 10^{-4}$ $C_{11}$ $3.5504 \times 10^{-5}C_{13}$ $-4.9795 \times 10^{-5}$
$C_{15}$ $3.4245 \times 10^{-5}$ $C_{17}$ $-2.8519 \times 10^{-6}C_{19}$ $1.5651 \times 10^{-6}$
$C_{21}$ $-5.4114 \times 10^{-6}$ FFS④
$C_4$ $-1.6714 \times 10^{-2}$ $C_6$ $-1.6634 \times 10^{-2}C_8$ $-3.9407 \times 10^{-3}$
$C_{10}$ $-1.3253 \times 10^{-3}$ $C_{11}$ $3.2603 \times 10^{-4}C_{13}$ $-4.7568 \times 10^{-4}$
$C_{15}$ $2.2097 \times 10^{-5}$ $C_{17}$ $2.8039 \times 10^{-5}C_{19}$ $-1.1364 \times 10^{-5}$
$C_{21}$ $4.9199 \times 10^{-6}$ FFS⑤
$C_4$ $-2.5334 \times 10^{-2}$ $C_6$ $-3.3736 \times 10^{-2}C_8$ $-1.0042 \times 10^{-2}$
$C_{10}$ $-1.2763 \times 10^{-2}$ $C_{11}$ $-1.4314 \times 10^{-3}C_{13}$ $5.1043 \times 10^{-3}$
$C_{15}$ $4.4909 \times 10^{-3}$ $C_{17}$ $-2.0148 \times 10^{-3}C_{19}$ $-3.8137 \times 10^{-4}$
$C_{21}$ $-5.9629 \times 10^{-4}$ Displacement and tilt(1)
X 0.00 Y 0.00 Z 2.07
α 0.02 β 0.00 γ 0.00

Displacement and tilt(2)
X 0.00 Y 0.00 Z 4.75
α −42.42 β 0.00 γ 0.00

Displacement and tilt(3)
X 0.00 Y 5.65 Z 4.24
α 51.91 β 0.00 γ 0.00

Displacement and tilt(4)
X 0.00 Y 4.73 Z −1.79
α 53.99 β 0.00 γ 0.00

Displacement and tilt(5)
X 0.00 Y 7.63 Z −2.26
α 97.32 β 0.00 γ 0.00

Displacement and tilt(6)
X 0.00 Y 8.56 Z −2.43
α 100.39 β 0.00 γ 0.00

EXAMPLE 2

| Surface No. | Radius curvature | Surface seperation | Displacement and tilt | Refractive index | Abbe's No. |
|---|---|---|---|---|---|
| Object plane | ∞ | −2000.00 | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| Image plane | ∞ | | (6) | | |

FFS①
$C_4$ $2.2766 \times 10^{-3}$ $C_6$ $-4.1613 \times 10^{-3}$ $C_8$ $-8.0633 \times 10^{-4}$
$C_{10}$ $1.0504 \times 10^{-3}$ $C_{11}$ $-7.7563 \times 10^{-5}$ $C_{13}$ $1.3878 \times 10^{-4}$
$C_{15}$ $-3.4547 \times 10^{-5}$ $C_{17}$ $2.1025 \times 10^{-5}$ $C_{19}$ $-4.6235 \times 10^{-5}$
$C_{21}$ $-5.6742 \times 10^{-6}$ FFS②
$C_4$ $2.4535 \times 10^{-3}$ $C_6$ $-4.3783 \times 10^{-3}$ $C_8$ $-2.4926 \times 10^{-4}$
$C_{10}$ $4.0842 \times 10^{-5}$ $C_{11}$ $-2.9981 \times 10^{-5}$ $C_{13}$ $1.9392 \times 10^{-5}$
$C_{15}$ $3.5102 \times 10^{-6}$ $C_{17}$ $4.7587 \times 10^{-6}$ $C_{19}$ $-3.5333 \times 10^{-6}$
$C_{21}$ $-1.3846 \times 10^{-7}$ FFS③
$C_4$ $1.0234 \times 10^{-2}$ $C_6$ $-4.8172 \times 10^{-3}$ $C_8$ $-2.6467 \times 10^{-4}$
$C_{10}$ $-4.2871 \times 10^{-4}$ $C_{11}$ $-1.1545 \times 10^{-5}$ $C_{13}$ $-5.1066 \times 10^{-6}$
$C_{15}$ $1.9538 \times 10^{-6}$ $C_{17}$ $5.2702 \times 10^{-7}$ $C_{19}$ $4.5311 \times 10^{-7}$
$C_{21}$ $5.2966 \times 10^{-7}$ FFS④
$C_4$ $-9.2766 \times 10^{-3}$ $C_6$ $-1.1918 \times 10^{-2}$ $C_8$ $-3.2952 \times 10^{-5}$
$C_{10}$ $-1.0603 \times 10^{-4}$ $C_{11}$ $-7.3782 \times 10^{-6}$ $C_{13}$ $4.2297 \times 10^{-7}$
$C_{15}$ $6.6899 \times 10^{-6}$ $C_{17}$ $3.3595 \times 10^{-8}$ $C_{19}$ $3.7845 \times 10^{-7}$
$C_{21}$ $-8.2461 \times 10^{-7}$ FFS⑤
$C_4$ $-6.4508 \times 10^{-2}$ $C_6$ $-6.3575 \times 10^{-2}$ $C_8$ $1.7555 \times 10^{-4}$
$C_{10}$ $-1.7016 \times 10^{-4}$ $C_{11}$ $-2.2598 \times 10^{-4}$ $C_{13}$ $-4.9835 \times 10^{-4}$
$C_{15}$ $2.9342 \times 10^{-4}$ $C_{17}$ $-8.3788 \times 10^{-5}$ $C_{19}$ $3.0349 \times 10^{-5}$
$C_{21}$ $-4.2161 \times 10^{-6}$ Displacement and tilt(1)
X 0.00 Y 0.00 Z 17.14
α 7.23 β 0.00 γ 0.00

Displacement and tilt(2)
X 0.00 Y 0.27 Z 23.31
α −39.85 β 0.00 γ 0.00

Displacement and tilt(3)
X 0.00 Y 13.40 Z 21.51
α −40.07 β 0.00 γ 0.00

Displacement and tilt(4)
X 0.00 Y 13.89 Z 35.06
α 42.26 β 0.00 γ 0.00

Displacement and tilt(5)
X 0.00 Y 6.62 Z 34.09
α 69.64 β 0.00 γ 0.00

Displacement and tilt(6)
X 0.00 Y −1.03 Z 34.02
α 89.41 β 0.00 γ 0.00

EXAMPLE 3

| Surface No. | Radius curvature | Surface seperation | Displacement and tilt | Refractive index | Abbe's No. |
|---|---|---|---|---|---|
| Object plane | ∞ | 3000.00 | | | |
| 1 | ∞ (Pupil) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| 7 | ∞ (IIP) | | (6) | | |
| 8 | 20.59 | | (7) | 1.5254 | 56.2 |
| 9 | ∞ | | (8) | 1.5254 | 56.2 |
| 10 | ∞ | | (9) | 1.5254 | 56.2 |
| 11 | −184.32 | | (10) | | |
| 12 | ASS① | 3.00 | (11) | 1.4924 | 57.6 |
| 13 | −26.75 | 15.00 | | | |
| 14 | ∞ (Stop) | 10.05 | | | |
| Image plane | ∞ | | | | |

ASS①
R 28.46
K 0.0000
A $-3.2434 \times 10^{-5}$
B $-1.2227 \times 10^{-6}$
C $5.0214 \times 10^{-8}$ FFS①
$C_4$ $-5.5207 \times 10^{-2}$ $C_6$ $-1.3221 \times 10^{-2}$ FFS②
$C_4$ $-1.3221 \times 10^{-2}$ $C_6$ $-1.8121 \times 10^{-3}$ $C_8$ $1.1703 \times 10^{-3}$
$C_{10}$ $1.5192 \times 10^{-4}$ $C_{11}$ $1.0196 \times 10^{-4}$ $C_{13}$ $-4.2316 \times 10^{-5}$ FFS③
$C_4$ $-2.2429 \times 10^{-2}$ $C_6$ $-1.3074 \times 10^{-2}$ $C_8$ $2.0501 \times 10^{-4}$
$C_{10}$ $-2.8256 \times 10^{-5}$ $C_{11}$ $-1.6519 \times 10^{-5}$ $C_{13}$ $-1.4893 \times 10^{-5}$
$C_{15}$ $-1.0367 \times 10^{-6}$ FFS④
$C_4$ $-1.1252 \times 10^{-2}$ $C_6$ $-7.9236 \times 10^{-4}$ $C_8$ $-3.2207 \times 10^{-4}$
$C_{10}$ $-3.8321 \times 10^{-4}$ $C_{11}$ $7.0905 \times 10^{-5}$ $C_{13}$ $1.4413 \times 10^{-5}$
$C_{15}$ $-4.8013 \times 10^{-7}$ $C_{17}$ $-5.1246 \times 10^{-6}$ FFS⑤
$C_4$ $-4.8688 \times 10^{-2}$ $C_6$ $-2.6178 \times 10^{-2}$ $C_8$ $-1.5175 \times 10^{-3}$
$C_{10}$ $-1.4982 \times 10^{-3}$ $C_{11}$ $1.7080 \times 10^{-4}$ $C_{13}$ $1.2728 \times 10^{-4}$
$C_{15}$ $1.9131 \times 10^{-6}$ Displacement and tilt(1)
X 0.00 Y −0.01 Z 0.94
α −2.57 β 0.00 γ 0.00

Displacement and tilt(2)
X 0.00 Y −0.05 Z 3.60
α −51.10 β 0.00 γ 0.00

Displacement and tilt(3)
X 0.00 Y 6.12 Z 4.83
α 42.94 β 0.00 γ 0.00

Displacement and tilt(4)
X 0.00 Y 5.10 Z −3.27
α 49.20 β 0.00 γ 0.00

Displacement and tilt(5)
X 0.00 Y 9.61 Z −3.33
α 93.36 β 0.00 γ 0.00

Displacement and tilt(6)
X 0.00 Y 10.62 Z −3.37
α 90.00 β 0.00 γ 0.00

Displacement and tilt(7)
X 0.00 Y 11.62 Z −3.37
α 90.00 β 0.00 γ 0.00

Displacement and tilt(8)
X 0.00 Y 25.42 Z −3.37
α 70.86 β 0.00 γ 0.00

Displacement and tilt(9)
X 0.00 Y 16.75 Z −10.21
α 25.86 β 0.00 γ 0.00

Displacement and tilt(10)
X 0.00 Y 16.75 Z 1.16
α 0.00 β 0.00 γ 0.00

Displacement and tilt(11)
X 0.00 Y 16.75 Z 2.16
α 0.00 β 0.00 γ 0.0

EXAMPLE 4

| Surface No. | Radius curvature | Surface seperation | Displacement and tilt | Refractive index | Abbe's No. |
|---|---|---|---|---|---|
| Object plane | ∞ | ∞ | | | |
| 2 | ∞ (Stop) | | | | |
| 3 | FFS① | | (1) | 1.5254 | 56.2 |
| 4 | FFS② | | (2) | 1.5254 | 56.2 |
| 5 | FFS③ | | (3) | 1.5254 | 56.2 |
| 6 | FFS④ | | (4) | 1.5254 | 56.2 |
| 7 | FFS⑤ | | (5) | | |
| Image plane | ∞ | | (6) | | |

FFS①
| $C_4$ | $-6.0756 \times 10^{-3}$ | $C_6$ | $-9.0367 \times 10^{-4}$ | $C_8$ | $-1.8060 \times 10^{-2}$ |
| $C_{10}$ | $-4.8841 \times 10^{-3}$ | $C_{11}$ | $-8.5699 \times 10^{-4}$ | $C_{13}$ | $1.4371 \times 10^{-3}$ |

FFS②
| $C_4$ | $2.1220 \times 10^{-2}$ | $C_6$ | $1.2388 \times 10^{-2}$ | $C_8$ | $-6.9835 \times 10^{-3}$ |
| $C_{10}$ | $-1.1502 \times 10^{-3}$ | $C_{11}$ | $-6.0225 \times 10^{-5}$ | $C_{13}$ | $7.9445 \times 10^{-4}$ |

FFS③
| $C_4$ | $2.6091 \times 10^{-2}$ | $C_6$ | $1.2218 \times 10^{-2}$ | $C_8$ | $-1.3807 \times 10^{-3}$ |
| $C_{10}$ | $-3.2614 \times 10^{-4}$ | $C_{11}$ | $-5.7873 \times 10^{-6}$ | $C_{13}$ | $4.5870 \times 10^{-5}$ |

FFS④
| $C_4$ | $-2.1823 \times 10^{-2}$ | $C_6$ | $-1.7703 \times 10^{-2}$ | $C_8$ | $1.6115 \times 10^{-4}$ |
| $C_{10}$ | $3.2721 \times 10^{-4}$ | $C_{11}$ | $3.3922 \times 10^{-6}$ | | |

FFS⑤
| $C_4$ | $-9.9664 \times 10^{-2}$ | $C_6$ | $-1.5450 \times 10^{-1}$ | $C_8$ | $7.2603 \times 10^{-3}$ |
| $C_{10}$ | $-4.7390 \times 10^{-3}$ | $C_{11}$ | $1.5082 \times 10^{-4}$ | $C_{13}$ | $-6.3667 \times 10^{-3}$ |

Displacement and tilt(1)
| X | 0.00 | Y | 0.00 | Z | 0.97 |
| α | -0.02 | β | 0.00 | γ | 0.00 |

Displacement and tilt(2)
| X | 0.00 | Y | 0.00 | Z | 4.01 |
| α | -47.11 | β | 0.00 | γ | 0.00 |

Displacement and tilt(3)
| X | 0.00 | Y | 7.64 | Z | 4.57 |
| α | -47.01 | β | 0.00 | γ | 0.00 |

Displacement and tilt(4)
| X | 0.00 | Y | 7.67 | Z | 15.27 |
| α | 35.07 | β | 0.00 | γ | 0.00 |

Displacement and tilt(5)
| X | 0.00 | Y | 3.11 | Z | 13.60 |
| α | 70.00 | β | 0.00 | γ | 0.00 |

Displacement and tilt(6)
| X | 0.00 | Y | -0.23 | Z | 12.38 |
| α | 69.91 | β | 0.00 | γ | 0.00 |

EXAMPLE 5

| Surface No. | Radius curvature | Surface seperation | Displacement and tilt | Refractive index | Abbe's No. |
|---|---|---|---|---|---|
| Object plane | ∞ | -2000.00 | | | |
| 1 | ∞ (Stop) | | | | |
| 2 | FFS① | | (1) | 1.5254 | 56.2 |
| 3 | FFS② | | (2) | 1.5254 | 56.2 |
| 4 | FFS③ | | (3) | 1.5254 | 56.2 |
| 5 | FFS④ | | (4) | 1.5254 | 56.2 |
| 6 | FFS⑤ | | (5) | | |
| Image plane | ∞ | | (6) | | |

FFS①
| $C_4$ | $-2.2399 \times 10^{-2}$ | $C_6$ | $-9.7715 \times 10^{-3}$ | $C_8$ | $1.0344 \times 10^{-3}$ |
| $C_{10}$ | $6.2768 \times 10^{-4}$ | $C_{11}$ | $-7.8202 \times 10^{-6}$ | $C_{13}$ | $-8.9180 \times 10^{-5}$ |
| $C_{15}$ | $1.6200 \times 10^{-5}$ | $C_{17}$ | $1.1095 \times 10^{-5}$ | $C_{19}$ | $-1.9850 \times 10^{-5}$ |
| $C_{21}$ | $-2.9099 \times 10^{-6}$ | | | | |

FFS②
| $C_4$ | $-7.3049 \times 10^{-3}$ | $C_6$ | $-2.9821 \times 10^{-3}$ | $C_8$ | $2.2902 \times 10^{-4}$ |
| $C_{10}$ | $1.7924 \times 10^{-5}$ | $C_{11}$ | $-1.3836 \times 10^{-7}$ | $C_{13}$ | $-6.6753 \times 10^{-6}$ |
| $C_{15}$ | $-3.3600 \times 10^{-7}$ | $C_{17}$ | $2.2329 \times 10^{-7}$ | $C_{19}$ | $-6.7887 \times 10^{-7}$ |
| $C_{21}$ | $-3.8196 \times 10^{-8}$ | | | | |

FFS③
| $C_4$ | $-1.1066 \times 10^{-2}$ | $C_6$ | $-3.0510 \times 10^{-3}$ | $C_8$ | $-1.2795 \times 10^{-3}$ |
| $C_{10}$ | $-1.3100 \times 10^{-4}$ | $C_{11}$ | $2.8416 \times 10^{-6}$ | $C_{13}$ | $-6.0056 \times 10^{-6}$ |
| $C_{15}$ | $-5.5938 \times 10^{-7}$ | $C_{17}$ | $-6.9347 \times 10^{-7}$ | $C_{19}$ | $1.7787 \times 10^{-8}$ |
| $C_{21}$ | $2.4337 \times 10^{-8}$ | | | | |

FFS④
| $C_4$ | $-6.7757 \times 10^{-3}$ | $C_6$ | $4.2916 \times 10^{-3}$ | $C_8$ | $-6.2518 \times 10^{-4}$ |
| $C_{10}$ | $-4.1745 \times 10^{-5}$ | $C_{11}$ | $4.2983 \times 10^{-5}$ | $C_{13}$ | $-4.3903 \times 10^{-5}$ |
| $C_{15}$ | $-5.2226 \times 10^{-6}$ | $C_{17}$ | $-1.4339 \times 10^{-6}$ | $C_{19}$ | $-1.9301 \times 10^{-7}$ |
| $C_{21}$ | $-1.2836 \times 10^{-7}$ | | | | |

FFS⑤
| $C_4$ | $1.4836 \times 10^{-3}$ | $C_6$ | $5.2545 \times 10^{-2}$ | $C_8$ | $-3.4994 \times 10^{-3}$ |
| $C_{10}$ | $-1.1878 \times 10^{-5}$ | $C_{11}$ | $1.6805 \times 10^{-4}$ | $C_{13}$ | $-2.7770 \times 10^{-3}$ |
| $C_{15}$ | $2.4839 \times 10^{-4}$ | $C_{17}$ | $3.4371 \times 10^{-5}$ | $C_{19}$ | $9.8121 \times 10^{-7}$ |
| $C_{21}$ | $2.3047 \times 10^{-5}$ | | | | |

Displacement and tilt(1)
| X | 0.00 | Y | 0.00 | Z | 17.89 |
| α | -0.68 | β | 0.00 | γ | 0.00 |

Displacement and tilt(2)
| X | 0.00 | Y | -0.03 | Z | 24.44 |
| α | -46.35 | β | 0.00 | γ | 0.00 |

Displacement and tilt(3)
| X | 0.00 | Y | 15.13 | Z | 25.10 |
| α | 41.09 | β | 0.00 | γ | 0.00 |

Displacement and tilt(4)
| X | 0.00 | Y | 16.61 | Z | 9.33 |
| α | 45.00 | β | 0.00 | γ | 0.00 |

Displacement and tilt(5)
| X | 0.00 | Y | 21.76 | Z | 8.85 |
| α | 97.45 | β | 0.00 | γ | 0.00 |

Displacement and tilt(6)
| X | 0.00 | Y | 27.00 | Z | 8.46 |
| α | 94.26 | β | 0.00 | γ | 0.00 |

FIGS. 6 to 10 are aberrational diagrams showing lateral aberrations in the above-described Examples 1 to 5. In the diagrams showing lateral aberrations, the numerals in the parentheses denote [horizontal (X-direction) field angle, vertical (Y-direction) field angle], and lateral aberrations at the field angles are shown. Each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-axis direction and minus about 70% of the image height in the Y-axis direction; lateral aberrations at the position of about 70% of the image height on the X-axis; lateral aberrations at the position of about 70% of the image height in the X-axis direction and about 70% of the image height in the Y-axis direction; and lateral aberrations at the position of about 70% of the image height on the Y-axis.

The values concerning the conditions (1) to (14) in the above-described examples are shown below. When there are a plurality of independent reflecting surfaces [condition (3)], values are shown in the column from the top in order in which rays pass.

| Conditions | Ex. 1 | Ex. 2 | Ex. 3 | Ex. 2 | Ex. 3 |
|---|---|---|---|---|---|
| (1), (2) | 8.7 | 15.4 | 8.1 | 24.7 | 5.0 |
| (3), (4) | 42.4 | 40.2 | 50.2 | 47.2 | 46.4 |
| | 43.3 | 42.1 | 35.7 | 34.9 | 46.1 |
| (5), (6) | 0.74 | 0.62 | 0.68 | 1.39 | 0.69 |
| (7), (8) | 45.3 | 42.3 | 42.0 | 47.1 | 50.4 |

-continued

| Conditions | Ex. 1 | Ex. 2 | Ex. 3 | Ex. 2 | Ex. 3 |
|---|---|---|---|---|---|
| (9), (10) | 100.3 | 89.4 | 90.0 | 69.9 | 94.3 |
| (11), (13) | 0 | 0 | 0 | 0 | 0 |
| (12), (14) | 0 | 0 | 0 | 0 | 0 |

Incidentally, the above-described prism optical system according to the present invention can be used in various image pickup apparatus, e.g. electronic cameras, in which a silver halide film or an electronic image pickup device, e.g. a CCD or a CMOS sensor, is placed in a plane where an object image is formed. Embodiments in which the present invention is applied to such apparatus will be described below.

Figure 11:
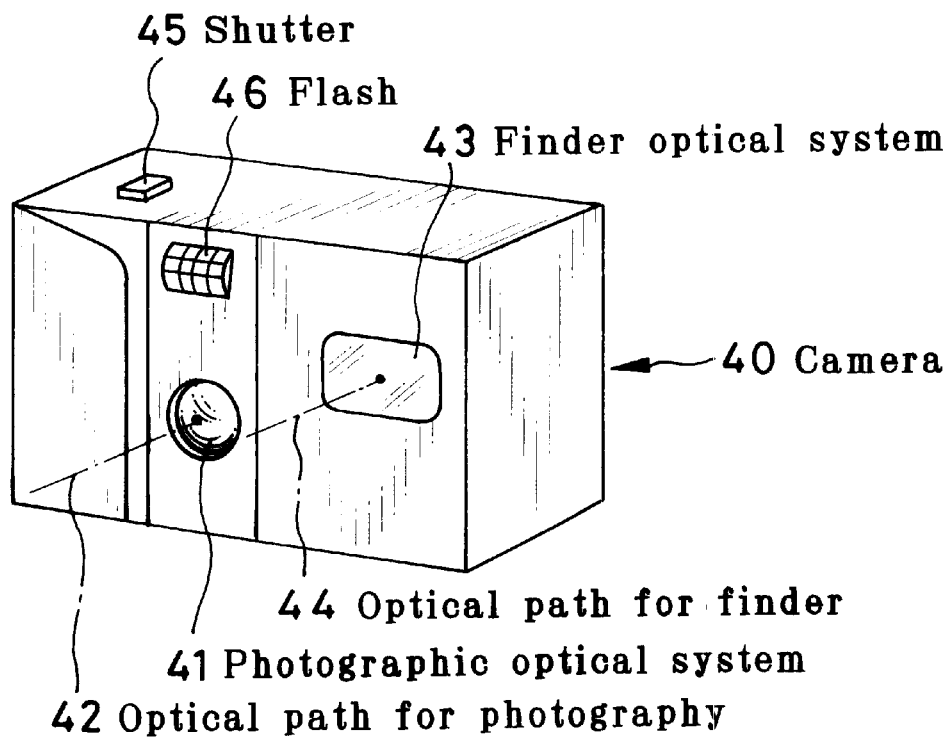
FIG. 11 is a perspective view showing the external appearance of an electronic camera to which a prism optical system according to the present invention is applied, as viewed from the front side thereof.
Figure 12:
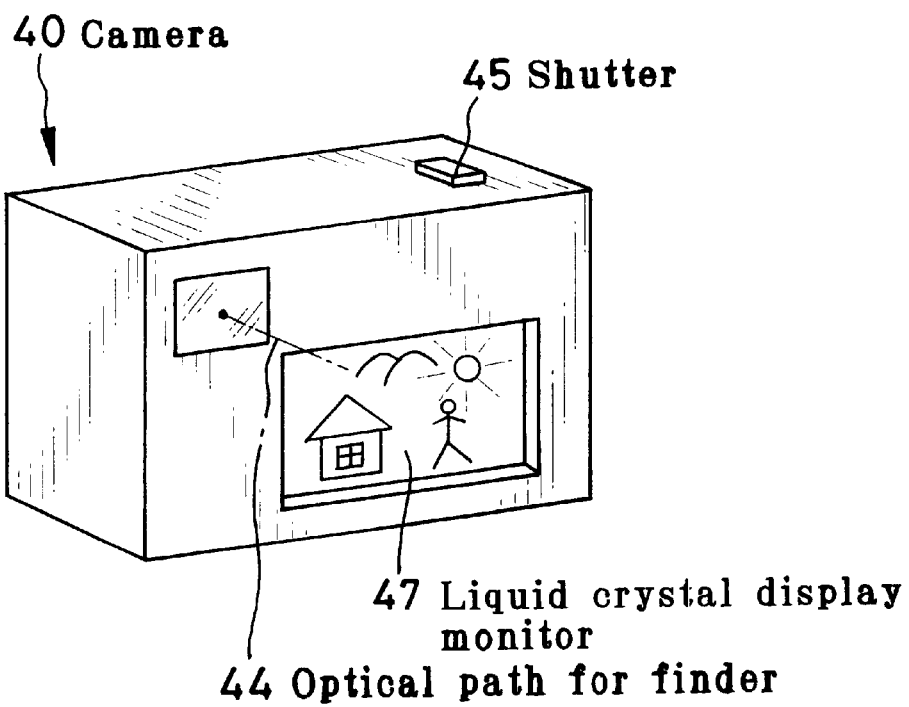
FIG. 12 is a perspective view of the electronic camera shown in FIG. 11, as viewed from the rear side thereof.
Figure 13:
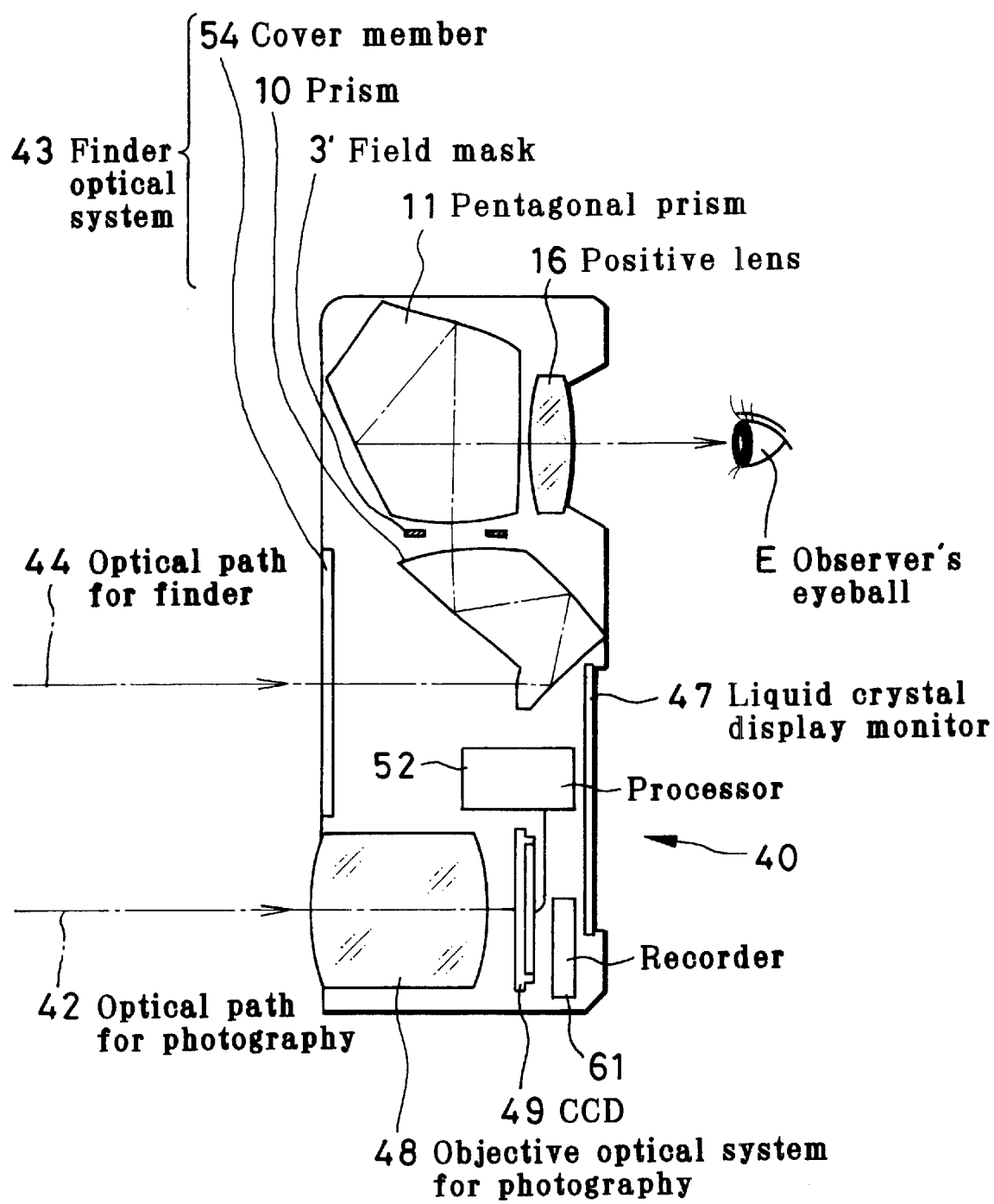
FIG. 13 is a sectional view showing the arrangement of the electronic camera in FIG. 11.

FIGS. 11 to 13 are conceptual views showing an arrangement in which a prism optical system according to the present invention is incorporated into a finder unit of an electronic camera. FIG. 11 is a perspective view showing the external appearance of an electronic camera 40 as viewed from the front side thereof. FIG. 12 is a perspective view of the electronic camera 40 as viewed from the rear side thereof. FIG. 13 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface of a CCD 49. The object image received by the CCD 49 is processed in a processor 52 and displayed as an electronic image on the liquid crystal display monitor 47, which is provided on the rear of the camera 40. A recorder 61 is connected to the processor 52 to enable the photographed electronic image to be recorded. It should be noted that the camera 40 may be arranged in the form of a silver halide camera in which a silver halide film is disposed in place of the CCD 49.

Furthermore, a finder optical system 43 arranged as shown, for example, in Example 3 is placed in the optical path 44 for the finder. Thus, a subject image can be viewed with an observer's eyeball E. Although in this case a plane-parallel plate is placed as a cover member 54 to constitute a part of the finder optical system 43, a concave lens may be disposed in place of the plane-parallel plate to enlarge the field angle.

In the camera 40, which is arranged as stated above, the finder optical system 43 can be constructed with a minimal number of optical members. Accordingly, a high-performance and low-cost camera can be realized. Consequently, the degree of freedom with which the constituent elements can be arranged in the camera increases. This is favorable for design.

Although no mention is made of the arrangement of the objective optical system 48 for photography in the electronic camera 40 shown in FIG. 13, it should be noted that the objective optical system 48 for photography may be formed by using not only a refracting coaxial optical system but also a decentered prism image-forming optical system comprising a prism 10 similar to the present invention, as a matter of course.

Next, an example of an image pickup apparatus using a prism optical system according to the present invention as an image-forming optical system.

Figure 14:
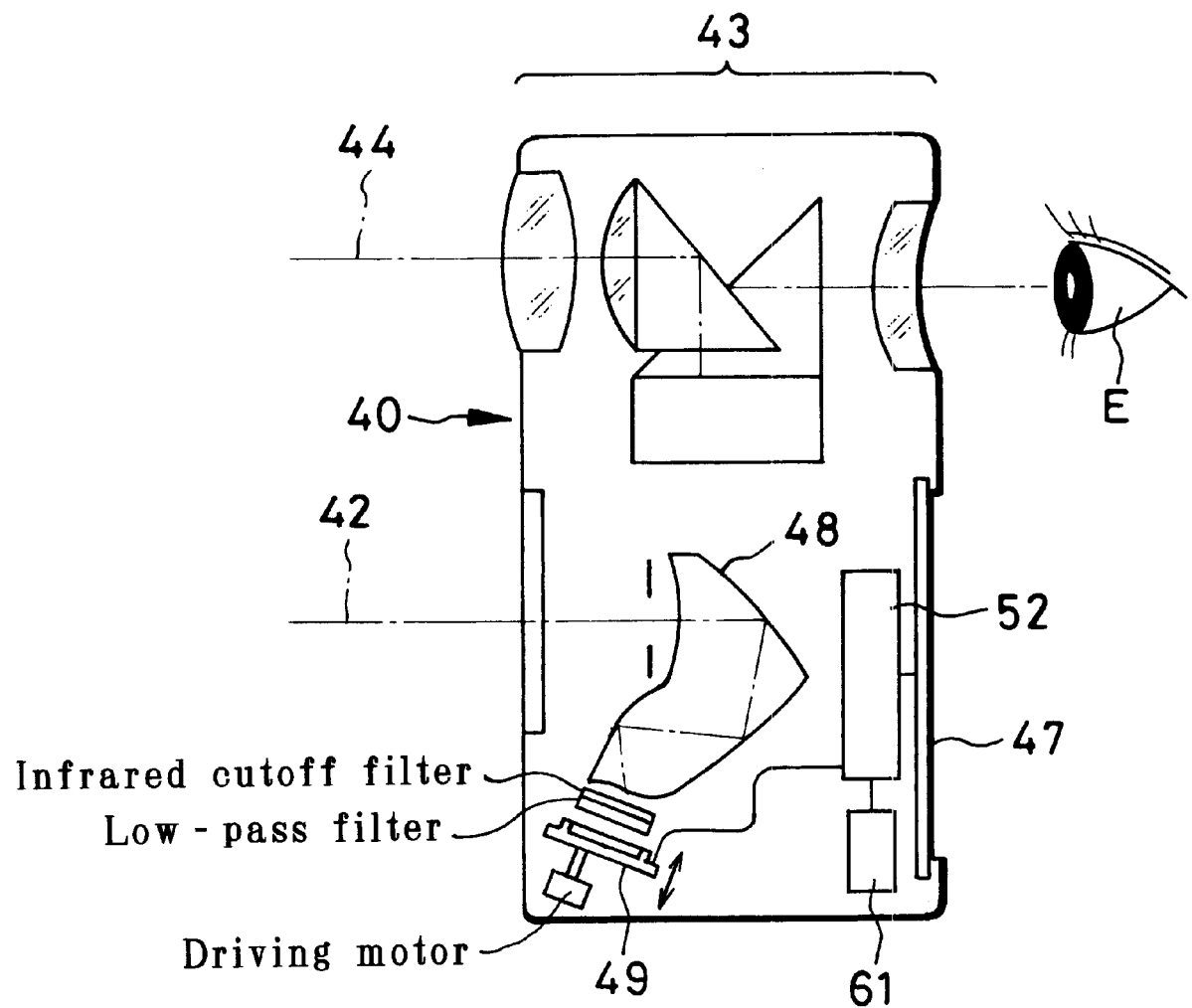
FIG. 14 is a sectional view showing an electronic camera using a prism optical system according to the present invention as an image-forming optical system.

FIG. 14 is a sectional view showing an electronic camera incorporating a prism optical system according to the present invention. It should be noted that the front perspective view showing the external appearance of the electronic camera according to this example and the rear perspective view showing the external appearance thereof are the same as FIGS. 11 and 12. When a shutter 45 placed on the top of the camera 40 is depressed, photography is performed through an objective lens 48 using a prism optical system according to the present invention. An object image produced by the prism optical system 48 is formed on an image pickup chip 49, e.g. a CCD, through an infrared cutoff filter and a low-pass filter.

The object image received by the image pickup chip 49 is inverted through an electrically connected processor 52 and displayed in the form of an erect electronic image on a liquid crystal display monitor 47 provided on the rear of the camera 40.

A finder optical system 43, which has an optical path 44 for the finder, includes an objective optical system for the finder and a Porro prism for erecting an object image formed by the objective optical system for the finder. The finder optical system 43 further includes an ocular lens for leading the object image to an observer's eyeball E.

In the camera 40, the finder optical system 43 may be omitted to reduce the number of parts and to form a compact and low-cost camera. In this case, the observer takes a photograph while viewing the liquid crystal display monitor 47.

In this example, focusing is effected by moving the image pickup chip 49 along the optical axis with a driving motor.

Figure 15:
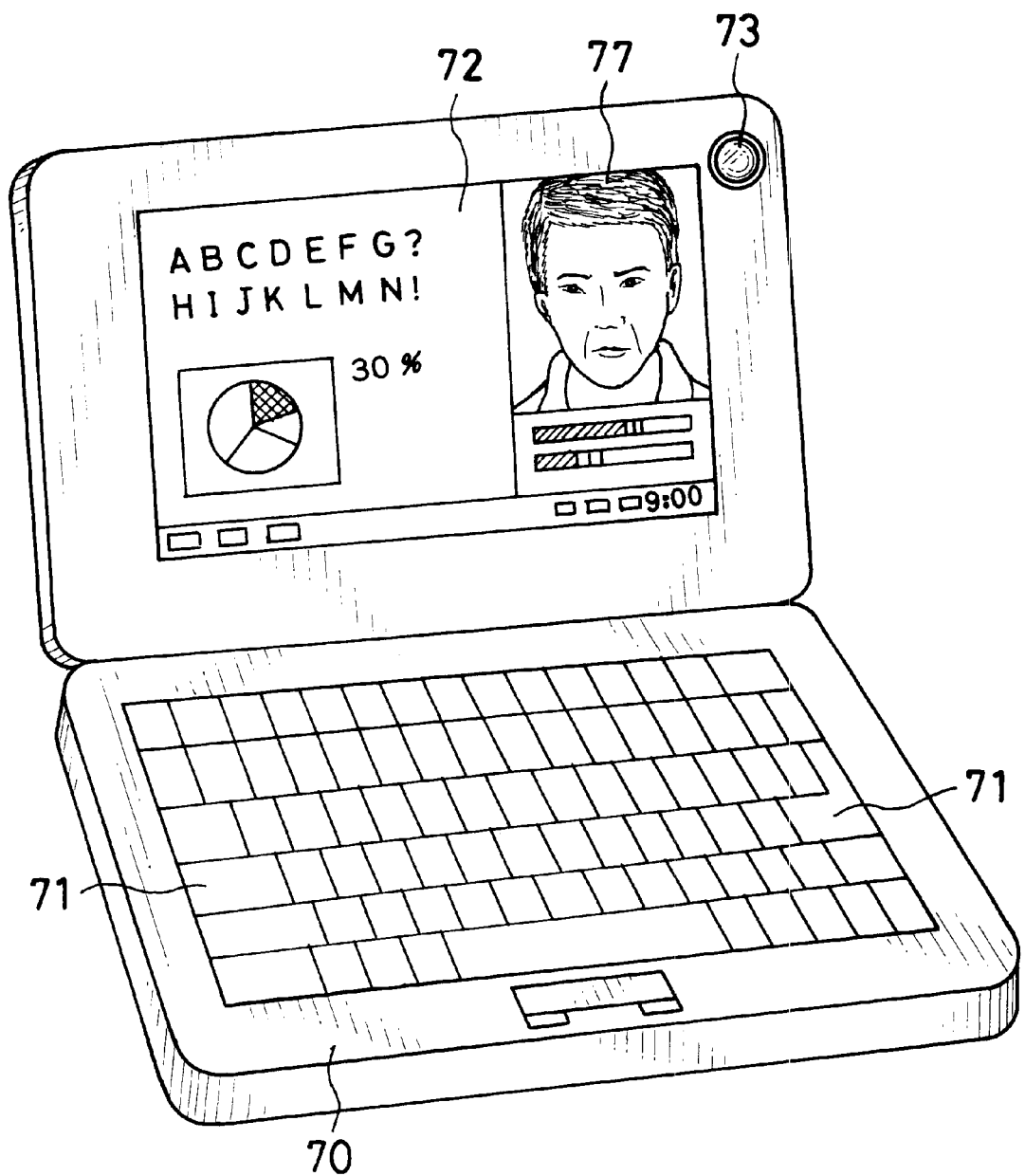
FIG. 15 is a perspective view showing a personal computer incorporating a prism optical system according to the present invention as an objective optical system, as viewed from the front side thereof, in a state where a cover is open.

Next, a personal computer as an example of an information processing apparatus incorporating a prism optical system according to the present invention will be described with reference to FIGS. 15 to 17.

Of these figures: FIG. 15 is a perspective view of a personal computer 70 as seen from the front side thereof in a state where a cover thereof is open; FIG. 16 is a sectional view of a photographic optical system 73 of the personal computer 70; and FIG. 17 is a side view of the personal computer 70 shown in FIG. 15.

As shown in these figures, the personal computer 70 has a keyboard 71 used by an operator to input information externally, and information processing and recording devices (not shown). The personal computer 70 further has a monitor 72 for displaying information for the operator, and a photographic optical system 73 for taking a photograph of the operator or an image of a surrounding object. In this case, the monitor 72 may be a transmissive liquid crystal display, which is illuminated from the rear side by a backlight (not shown), or a reflective liquid crystal display, which displays information by reflecting light applied from the front side thereof. The monitor 72 may also be a CRT display or the like. Although the photographic optical system 73 is incorporated in a portion at the top right corner of the monitor 72, the position of the photographic optical system 73 is not necessarily limited to the illustrated position. The photographic optical system 73 may be provided at any position around the monitor 72 or around the keyboard 71.

The photographic optical system 73 used in the personal computer 70 has, in a photographic optical path 74, a cover glass 54 of negative power, a prism optical system 74' according to the present invention, and an image pickup chip 75 for receiving an object image. These constituent elements of the photographic optical system 73 are incorporated in the personal computer 70.

Figure 16:
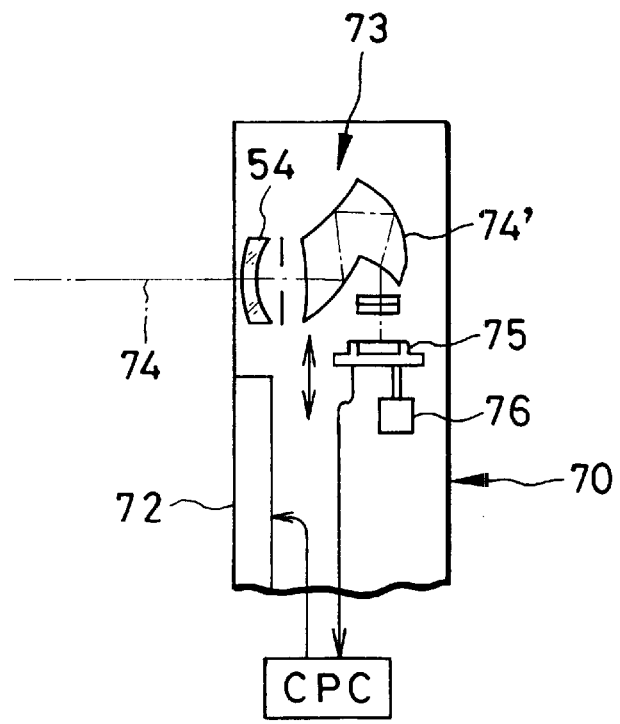
FIG. 16 is a sectional view of a photographic optical system of the personal computer.
Figure 17:
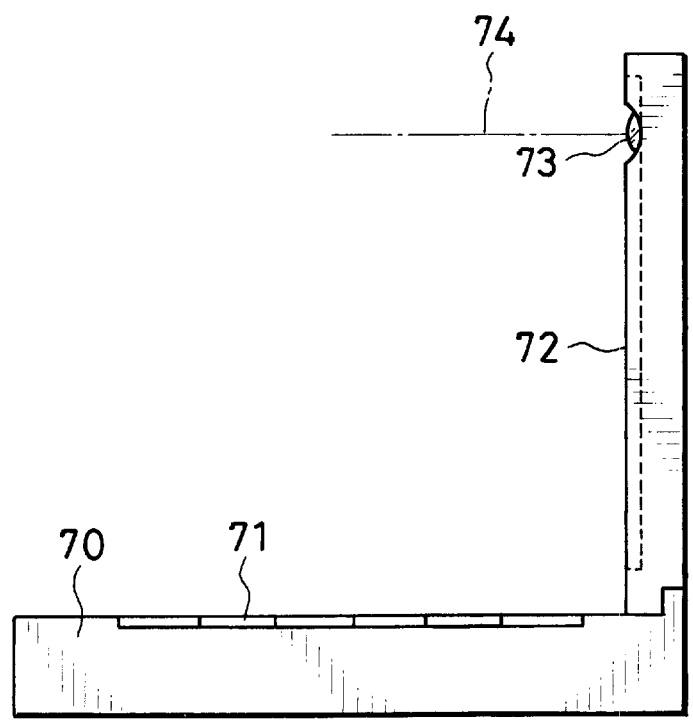
FIG. 17 is a side view of the personal computer in the state shown in FIG. 15.

As shown in FIG. 16, focusing of the photographic optical system 73 incorporated in the personal computer 70 is effected by vertically moving the image pickup chip 75 with respect to the prism optical system 74 with a driving motor 76.

An object image received by the image pickup chip 75 is input to a processing device (CPU) of the personal computer 70 and displayed on the monitor 72 in the form of an erect electronic image. FIG. 15 shows a photographed image 77 of the operator as an example of the electronic image. The image 77 can also be transferred so as to be displayed on a personal computer of the person on the other end of a communication line from a remote place through the processing device via the internet or telephone lines.

Figure 18:
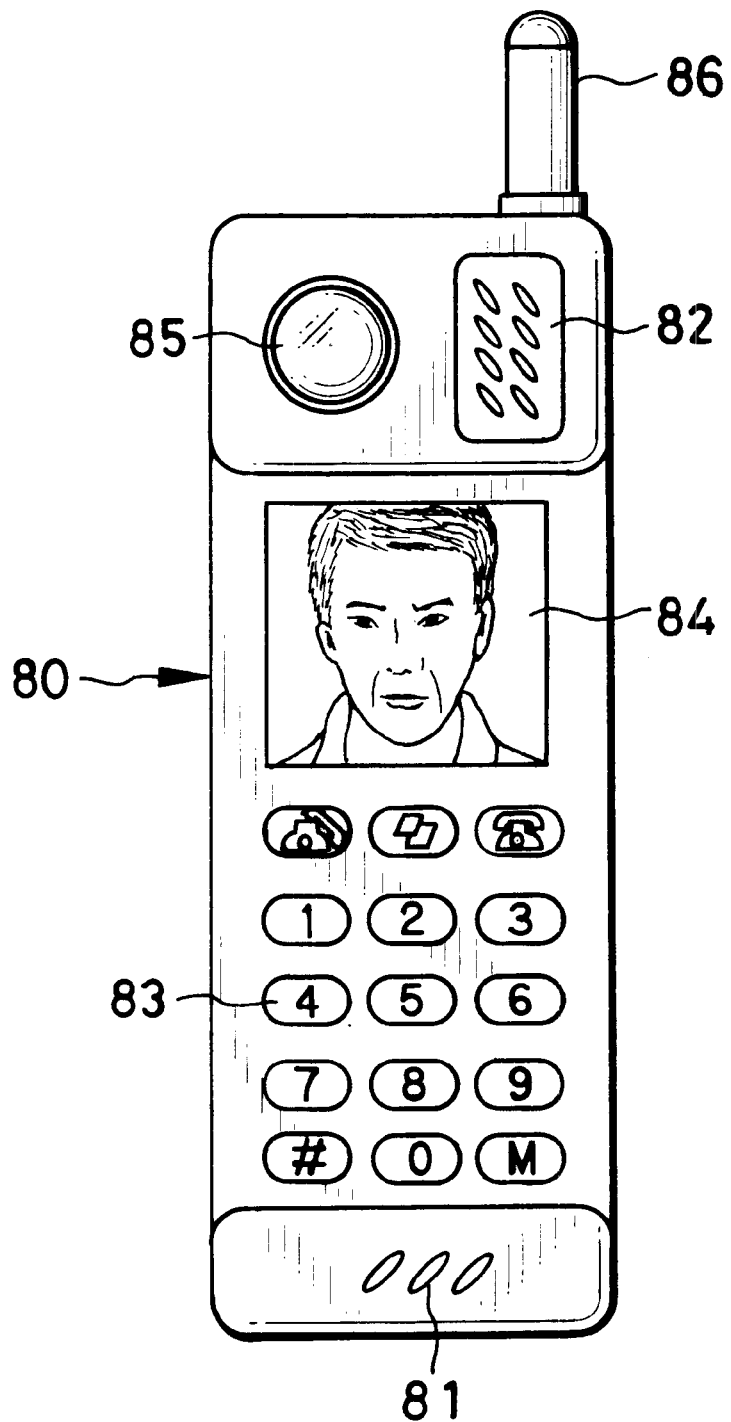
FIG. 18 is a front view of a portable telephone incorporating a prism optical system according to the present invention as an objective optical system.
Figure 19:
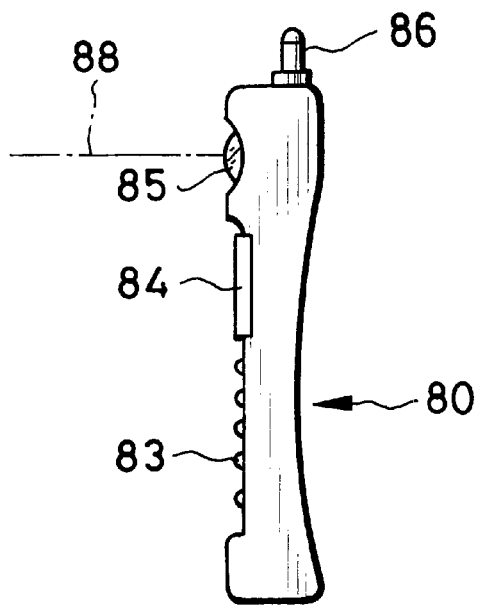
FIG. 19 is a side view of the portable telephone shown in FIG. 18.
Figure 20:
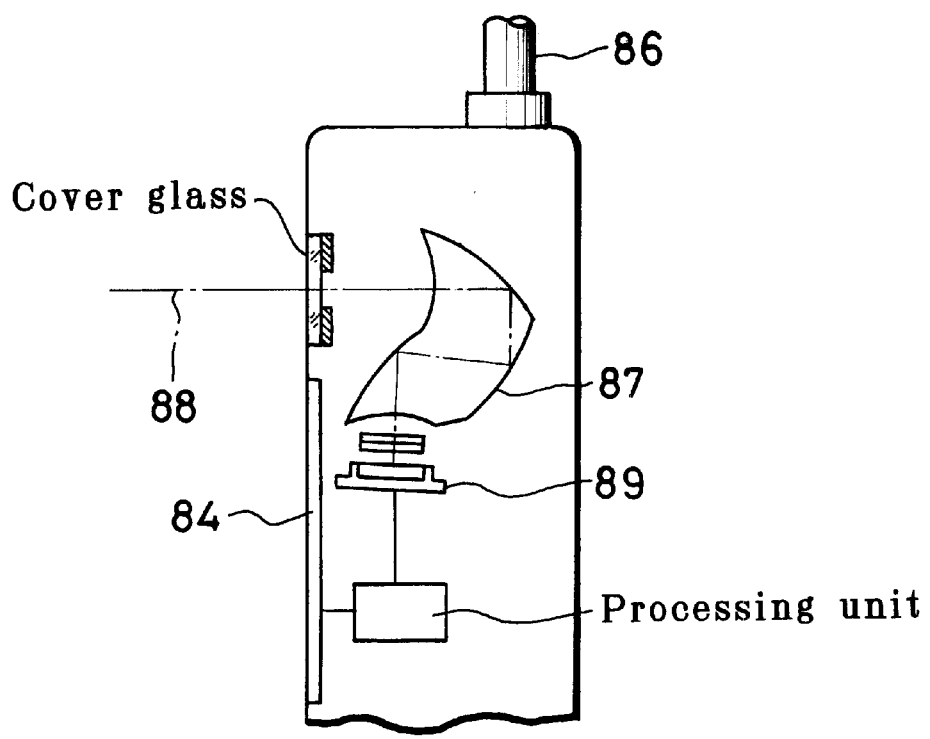
FIG. 20 is a sectional view of a photographic optical system of the portable telephone shown in FIG. 18.
Figure 21:
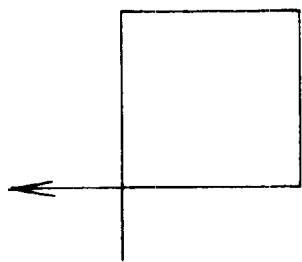
FIG. 21 is a diagram showing possible optical paths of prisms in which there are three reflections.
Figure 21:
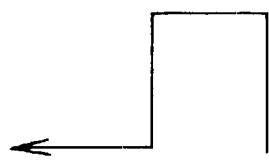
Figure 21:
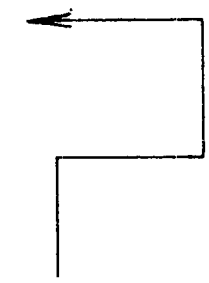
Figure 21:
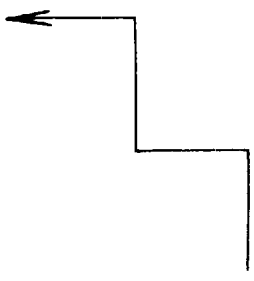

Next, FIGS. 18 to 20 show a telephone as an example of information processing apparatus incorporating a prism optical system according to the present invention, particularly a portable telephone, which is handy to carry.

FIG. 18 is a front view of a portable telephone 80, and FIG. 19 is a side view thereof. FIG. 20 is a sectional view of a prism optical system used in the portable telephone 80.

As shown in FIGS. 18 to 20, the portable telephone 80 has a microphone unit 81 for inputting the voice of the operator as information and a speaker unit 82 for outputting the voice of the person on the other end of a communication line. The portable telephone 80 further has input keys 83 used by the operator to input information, and a monitor 84, e.g. a liquid crystal display, for displaying information, e.g. a photographed image of the operator or the person on the other end of the line, and a telephone number. In addition, the portable telephone 80 has a photographic optical system 85, an antenna 86 for transmitting and receiving electric waves for telephonic communication, and a processing unit for processing image information, communication information, input signals, etc. It should be noted that the layout of the constituent elements shown in the figures is merely an example. The present invention is not necessarily limited to the illustrated layout.

The photographic optical system 85 incorporated in the portable telephone 80 has an objective lens 87 comprising a prism optical system according to the present invention, and an image pickup chip 89 for receiving an object image. The objective lens 87 and the image pickup chip 89 are placed in an optical path 88 for photography.

In the photographic optical system 85, an object image received by the image pickup chip 89 is erected in the processing unit and displayed in the form of an electronic image on the monitor 84 or on the monitor of a person on the other end of a communication line. Alternatively, the object image is displayed on both the monitors. The processing unit further includes a signal processing function to covert information concerning the object image received by the image pickup chip 89 into a transmittable signal when the image is to be transmitted to a person on the other end of a communication line.

As will be clear from the foregoing description, it is possible according to the present invention to provide a compact and high-performance prism optical system favorably corrected for aberrations due to decentration by appropriately using rotationally asymmetric surfaces.

I claim:

1. A prism optical system comprising, in order in which light rays pass from an object side thereof:
    a first transmitting surface;
    a first reflecting surface;
    a second reflecting surface;
    a third reflecting surface; and
    a second transmitting surface;
    wherein when an axial principal ray is projected onto a plane defined by three points at which the axial principal ray impinges on the first transmitting surface, the first reflecting surface and the second reflecting surface, the projected axial principal ray forms an optical path that bends at the second reflecting surface and the third reflecting surface in a same direction with respect to a direction of travel of the rays and bends at the first reflecting surface in a direction different from the direction of bending at the second reflecting surface and the third reflecting surface, and at least one of the three reflecting surfaces is a rotationally asymmetric surface.

2. A prism optical system according to claim 1, wherein the first reflecting surface, the second reflecting surface and the third reflecting surface are independent of the first transmitting surface and the second transmitting surface.

3. A prism optical system according to claim 1, wherein the projected axial principal ray does not cross itself in the prism.

4. A prism optical system according to claim 1, wherein the two reflecting surfaces at which the projected axial principal ray bends in the same direction consecutively satisfy the following condition:

$$0° < \theta < 45° \quad (1)$$

where $\theta$ is an angle formed between the projected axial principal ray incident on a second reflecting surface of the two reflecting surfaces at which the projected axial principal ray bends in the same direction consecutively and the projected axial principal ray exiting from a third reflecting surface of the two reflecting surfaces, wherein $\theta$ is a smaller angle of two angles formed between the projected axial principal ray incident on the second reflecting surface and the projected axial principal ray exiting from the third reflecting surface; therefore, $\theta$ ranges from 0° to less than 180°.

5. A prism optical system according to claim 1, wherein the two reflecting surfaces at which the projected axial principal ray bends in the same direction consecutively satisfy the following condition:

$$0° < \theta < 30° \quad (2)$$

where $\theta$ is an angle formed between the projected axial principal ray incident on a second reflecting surface of the two reflecting surfaces at which the projected axial principal ray bends in the same direction consecutively and the projected axial principal ray exiting from a third reflecting surface of the two reflecting surfaces, wherein $\theta$ is a smaller angle of two angles formed between the projected axial principal ray incident on the second reflecting surface and the projected axial principal ray exiting from the third reflecting surface; therefore, $\theta$ ranges from 0° to less than 180°.

6. A prism optical system according to claim 1, wherein at least one of the two reflecting surfaces at which the projected axial principal ray bends in the same direction consecutively satisfies the following condition:

$$10° < \phi_1 < 70° \quad (3)$$

where $\phi_1$ is a reflection angle of the axial principal ray at the two reflecting surfaces at which the projected axial principal ray bends in the same direction consecutively.

7. A prism optical system according to claim 1, wherein at least one of the two reflecting surfaces at which the projected axial principal ray bends in the same direction consecutively satisfies the following condition:

$$20° < \phi_1 < 60° \quad (4)$$

where $\phi_1$ is a reflection angle of the axial principal ray at the two reflecting surfaces at which the projected axial principal ray bends in the same direction consecutively.

8. A prism optical system according to claim 1, wherein the two reflecting surfaces at which the projected axial principal ray bends in the same direction consecutively satisfy the following condition:

$$0.1 < |d/f| < 3 \quad (5)$$

where d is a distance between said two reflecting surfaces along the axial principal ray, and f is a focal length of said prism optical system.

9. A prism optical system according to claim 1, wherein the two reflecting surfaces at which the projected axial principal ray bends in the same direction consecutively satisfy the following condition:

$$0.3 < |d/f| < 2 \quad (6)$$

where d is a distance between said two reflecting surfaces along the axial principal ray, and f is a focal length of said prism optical system.

10. A prism optical system according to claim 1, wherein the reflecting surface at which the projected axial principal ray bends in a direction different from the direction of bending at the two other reflecting surfaces satisfies the following condition:

$$20° < \phi_2 < 70° \quad (7)$$

where $\phi_2$ is a reflection angle of the axial principal ray at the reflecting surface at which the projected axial principal ray bends in a direction different from the direction of bending at the two other reflecting surfaces.

11. A prism optical system according to claim 1, wherein the reflecting surface at which the projected axial principal ray bends in a direction different from the direction of bending at the two other reflecting surfaces satisfies the following condition:

$$30° < \phi_2 < 60° \quad (8)$$

where $\phi_2$ is a reflection angle of the axial principal ray at the reflecting surface at which the projected axial principal ray bends in a direction different from the direction of bending at the two other reflecting surfaces.

12. A prism optical system according to claim 1, wherein the projected axial principal ray entering said prism optical system and the projected axial principal ray exiting from said prism optical system satisfy the following condition:

$$45° < \omega < 135° \quad (9)$$

where $\omega$ is an angle formed between the projected axial principal ray entering the prism and the projected axial principal ray exiting from the prism, wherein $\omega$ is a smaller angle of two angles formed between the projected axial principal ray entering the prism and the projected axial principal ray exiting from the prism; therefore, $\omega$ ranges from 0° to less than 180°.

13. A prism optical system according to claim 1, wherein the projected axial principal ray entering said prism optical system and the projected axial principal ray exiting from said prism optical system satisfy the following condition:

$$60° < \omega < 120° \quad (10)$$

where $\omega$ is an angle formed between the projected axial principal ray entering the prism and the projected axial principal ray exiting from the prism, wherein $\omega$ is a smaller angle of two angles formed between the projected axial principal ray entering the prism and the projected axial principal ray exiting from the prism; therefore $\omega$ ranges from 0° to less than 180°.

14. A prism optical system according to claim 1, wherein an exit angle at the second reflecting surface and an exit angle at the third reflecting surface satisfy the following conditions:

$$0° < \alpha_2 < 30° \quad (11)$$

$$0° < \alpha_3 < 30° \quad (12)$$

where $\alpha_2$ is an angle formed between the plane defined by three points at which the axial principal ray impinges on the first transmitting surface, the first reflecting surface and the second reflecting surface and the axial principal ray exiting from the second reflecting surface, and $\alpha_3$ is an angle formed between the plane defined by three points at which the axial principal ray impinges on the first transmitting surface, the first reflecting surface and the second reflecting surface and the axial principal ray exiting from the third reflecting surface.

15. A prism optical system according to claim 1, wherein an exit angle at the second reflecting surface and an exit angle at the third reflecting surface satisfy the following conditions:

$$0° < \alpha_2 < 15° \quad (13)$$

$$0° < \alpha_3 < 15° \quad (14)$$

where $\alpha_2$ is an angle formed between the plane defined by three points at which the axial principal ray impinges on the first transmitting surface, the first reflecting surface and the second reflecting surface and the axial principal ray exiting from the second reflecting surface, and $\alpha_3$ is an angle formed between the plane defined by the three points at which the axial principal ray impinges on the first transmitting surface, the first reflecting surface and the second reflecting surface and the axial principal ray exiting from the third reflecting surface.

16. A prism optical system according to claim 1, wherein at least one of the three reflecting surfaces performs total reflection.

17. A prism optical system according to claim 1, wherein at least two of the three reflecting surfaces have a positive power.

18. An image pickup apparatus comprising:

a photographic optical system having an optical path for photography; and a finder optical system having an optical path for a finder;

wherein said prism optical system according to claim 1 is incorporated in said finder optical system.

19. An image pickup apparatus comprising:

an image-forming optical system for forming an object image;

an image pickup device for receiving said object image and converting it into an electric signal;

a display unit for displaying an image on a basis of said image signal;

wherein said prism optical system according to claim 1 is incorporated as said image-forming optical system.

* * * * *